(12) United States Patent
Ma et al.

(10) Patent No.: US 12,040,867 B2
(45) Date of Patent: Jul. 16, 2024

(54) DIFFERENTIAL REPORTING MODE FOR AMPLITUDE AND/OR CO-PHASE

(71) Applicant: QUALCOMM Incorporated, San Diego, CA (US)

(72) Inventors: Ruifeng Ma, Beijing (CN); Yuwei Ren, Beijing (CN); Bo Chen, Beijing (CN); Yu Zhang, Beijing (CN); Liangming Wu, Beijing (CN); Chenxi Hao, Beijing (CN); Renqiu Wang, San Diego, CA (US); Hao Xu, Beijing (CN); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 17/310,350

(22) PCT Filed: Feb. 11, 2020

(86) PCT No.: PCT/CN2020/074684
§ 371 (c)(1),
(2) Date: Jul. 28, 2021

(87) PCT Pub. No.: WO2020/164463
PCT Pub. Date: Aug. 20, 2020

(65) Prior Publication Data
US 2022/0077909 A1 Mar. 10, 2022

(30) Foreign Application Priority Data
Feb. 12, 2019 (WO) ............... PCT/CN2019/074821

(51) Int. Cl.
*H04B 7/06* (2006.01)
*H04W 72/23* (2023.01)

(52) U.S. Cl.
CPC .......... *H04B 7/0626* (2013.01); *H04W 72/23* (2023.01)

(58) Field of Classification Search
CPC ..... H04B 7/0626; H04W 24/10; H04W 72/23
See application file for complete search history.

(56) References Cited

U.S. PATENT DOCUMENTS

2010/0008431 A1\* 1/2010 Wu .................... H04W 8/24
375/244
2018/0167116 A1\* 6/2018 Rahman ............... H04B 7/0478
(Continued)

FOREIGN PATENT DOCUMENTS

CN      103095401 A    5/2013
CN      108599832 A    9/2018
(Continued)

OTHER PUBLICATIONS

Qualcomm Incorporated: "On Type II CSI Feedback", 3GPP TSG RAN WG1 #89, R1-1708593, 3rd Generation Partnership Project, Mobile Competence Centre, 650, Route Des Lucioles, F-06921 Sophia-Antipolis Cedex, France, vol. RAN WG1, No. Hangzhou, China, May 14, 2017-May 19, 2017, 10 Pages, May 14, 2017, XP051273784, the whole document.
(Continued)

*Primary Examiner* — Kashif Siddiqui
(74) *Attorney, Agent, or Firm* — QUALCOMM Incorporated

(57) ABSTRACT

Various aspects of the present disclosure generally relate to wireless communication. In some aspects, a base station may determine that a user equipment (UE) is to use a differential reporting mode based at least in part on a channel state information (CSI) report from the UE. The base station may transmit to the UE, signaling to cause the UE to use the differential reporting mode based at least in part on deter-
(Continued)

mining that the UE is to use the differential reporting mode. Numerous other aspects are provided.

30 Claims, 19 Drawing Sheets

(56) References Cited

U.S. PATENT DOCUMENTS

| | | | |
|---|---|---|---|
| 2018/0175922 A1* | 6/2018 | Nishimori | H04B 17/11 |
| 2021/0391906 A1* | 12/2021 | Oteri | H04L 5/0048 |
| 2022/0029683 A1* | 1/2022 | Li | H04B 7/0641 |
| 2022/0131590 A1* | 4/2022 | Ma | H04B 7/0456 |

FOREIGN PATENT DOCUMENTS

| | | |
|---|---|---|
| EP | 3370357 A1 | 9/2018 |
| WO | 2014012509 A1 | 1/2014 |
| WO | 2018202134 A1 | 11/2018 |

OTHER PUBLICATIONS

Samsung: "Differential Reporting for Type II CSI", 3GPP TSG RAN WG1 Meeting #91, R1-1720298, 3rd Generation Partnership Project, Mobile Competence Centre, 650, Route Des Lucioles, F-06921 Sophia-Antipolis, Cedex, France, vol. RAN WG1, No. Athens, Greece, Reno, USA, Nov. 27-Dec. 1, 2017, XP051368947, 7 Pages, Nov. 17, 2017 (Nov. 17, 2017), Sections 1-3, the whole document.
Supplementary European Search Report—EP20756496—Search Authority—Munich—dated Oct. 24, 2022.
ZTE: "CSI Enhancement for MU-MIMO Support", 3GPP TSG RAN WG1 Meeting #95, R1-1813913, 3rd Generation Partnership Project, Mobile Competence Centre, 650, Route Des Lucioles, F-06921 Sophia-Antipolis Cedex, France, Spokane, USA, Nov. 12-16, 2018, 11 Pages, Nov. 13, 2018 (Nov. 13, 2018), XP051480110, p. 1-p. 9, Figures 1-4, the whole document.
International Search Report and Written Opinion—PCT/CN2019/074821—ISA/EPO—dated Oct. 29, 2019.
International Search Report and Written Opinion—PCT/CN2020/074684—ISAEPO—dated Apr. 26, 2020.

* cited by examiner

DIFFERENTIAL REPORTING MODE FOR AMPLITUDE AND/OR CO-PHASE

CROSS-REFERENCE TO RELATED APPLICATIONS

This application is a 371 national stage of PCT Application No. PCT/CN2020/074684 filed on Feb. 11, 2020, entitled "DIFFERENTIAL REPORTING MODE FOR AMPLITUDE AND/OR CO-PHASE," which claims priority to Patent Cooperation Treaty (PCT) Application No. PCT/CN2019/074821, filed on Feb. 12, 2019, entitled "DIFFERENTIAL REPORTING MODE FOR AMPLITUDE AND/OR CO-PHASE," which are hereby expressly incorporated by reference herein.

FIELD OF THE DISCLOSURE

Aspects of the present disclosure generally relate to wireless communication, and to techniques and apparatuses for a differential reporting mode for amplitude and/or co-phase.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining to use a differential reporting mode based at least in part on a channel state information (CSI) report to be transmitted to a base station (BS), wherein the differential reporting mode is associated with reporting an amplitude differential or a co-phase differential for a set of channels; and transmitting, to the BS, the CSI report to indicate to the BS that the UE is to use the differential reporting mode.

In some aspects, a UE for wireless communication may include memory and one or more processors operatively coupled to the memory. The memory and the one or more processors may be configured to determine to use a differential reporting mode based at least in part on a CSI report to be transmitted to a BS, wherein the differential reporting mode is associated with reporting an amplitude differential or a co-phase differential for a set of channels; and transmit, to the BS, the CSI report to indicate to the BS that the UE is to use the differential reporting mode.

In some aspects, a non-transitory computer-readable medium may store one or more instructions for wireless communication. The one or more instructions, when executed by one or more processors of a UE, may cause the one or more processors to: determine to use a differential reporting mode based at least in part on a CSI report to be transmitted to a BS, wherein the differential reporting mode is associated with reporting an amplitude differential or a co-phase differential for a set of channels; and transmit, to the BS, the CSI report to indicate to the BS that the UE is to use the differential reporting mode.

In some aspects, a first apparatus for wireless communication may include means for determining to use a differential reporting mode based at least in part on a CSI report to be transmitted to a second apparatus, wherein the differential reporting mode is associated with reporting an amplitude differential or a co-phase differential for a set of channels; and means for transmitting, to the second apparatus, the CSI report to indicate to the second apparatus that the first apparatus is to use the differential reporting mode.

In some aspects, a method of wireless communication, performed by a BS, may include determining that a UE is to use a differential reporting mode based at least in part on a CSI report from the UE, wherein the differential reporting mode is associated with reporting an amplitude differential or a co-phase differential for a set of channels; and transmitting, to the UE, signaling to cause the UE to use the differential reporting mode based at least in part on determining that the UE is to use the differential reporting mode.

In some aspects, a BS for wireless communication may include memory and one or more processors operatively coupled to the memory. The memory and the one or more processors may be configured to determine that a UE is to use a differential reporting mode based at least in part on a CSI report from the UE, wherein the differential reporting mode is associated with reporting an amplitude differential or a co-phase differential for a set of channels; and transmit, to the UE, signaling to cause the UE to use the differential reporting mode based at least in part on determining that the UE is to use the differential reporting mode.

In some aspects, a non-transitory computer-readable medium may store one or more instructions for wireless communication. The one or more instructions, when executed by one or more processors of a BS, may cause the one or more processors to: determine that a UE is to use a differential reporting mode based at least in part on a CSI report from the UE, wherein the differential reporting mode is associated with reporting an amplitude differential or a co-phase differential for a set of channels; and transmit, to the UE, signaling to cause the UE to use the differential reporting mode based at least in part on determining that the UE is to use the differential reporting mode.

In some aspects, a first apparatus for wireless communication may include means for determining that a second apparatus is to use a differential reporting mode based at least in part on a CSI report from the second apparatus, wherein the differential reporting mode is associated with reporting an amplitude differential or a co-phase differential for a set of channels; and means for transmitting, to the second apparatus, signaling to cause the second apparatus to use the differential reporting mode based at least in part on determining that the second apparatus is to use the differential reporting mode.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
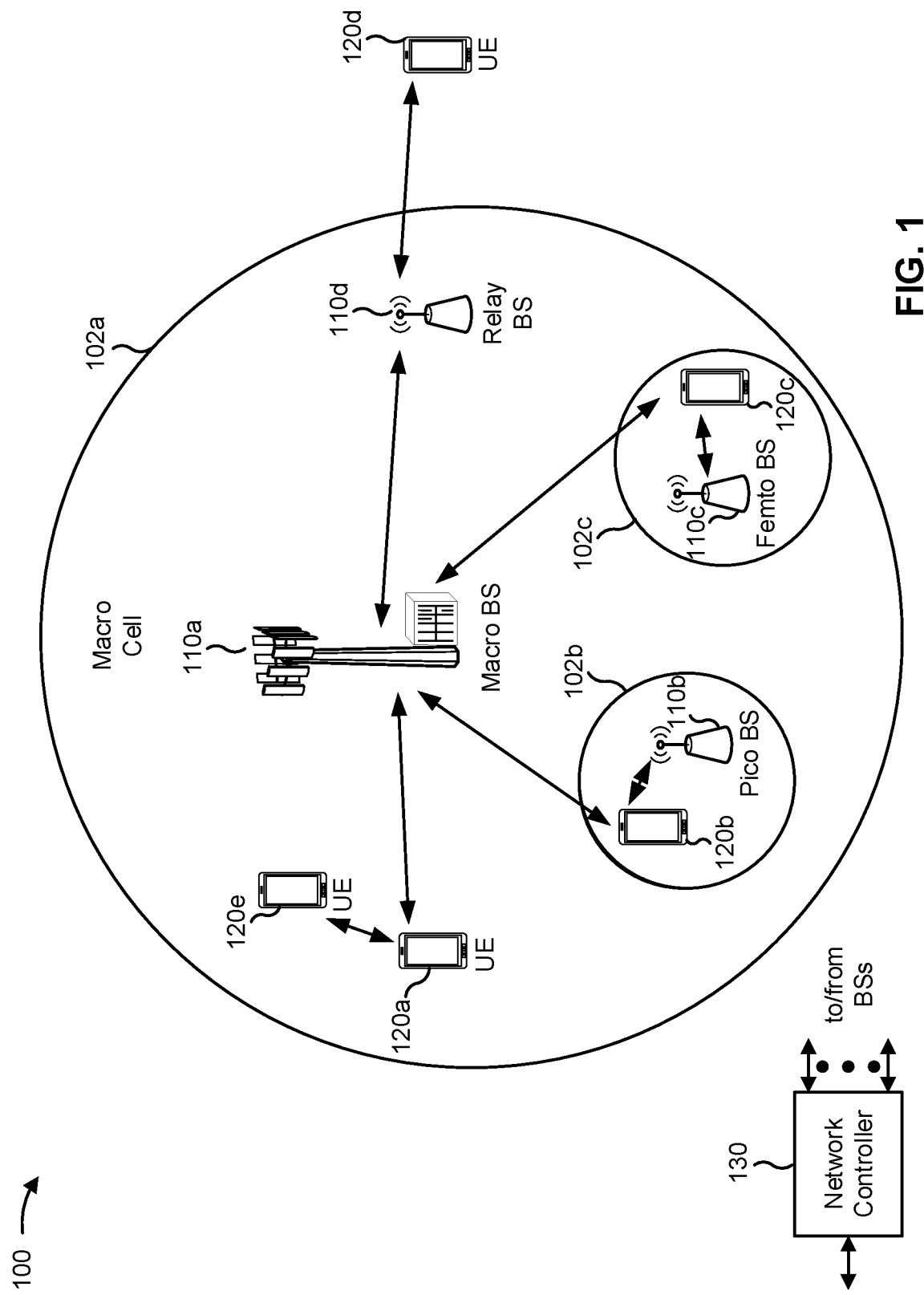
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband interne of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
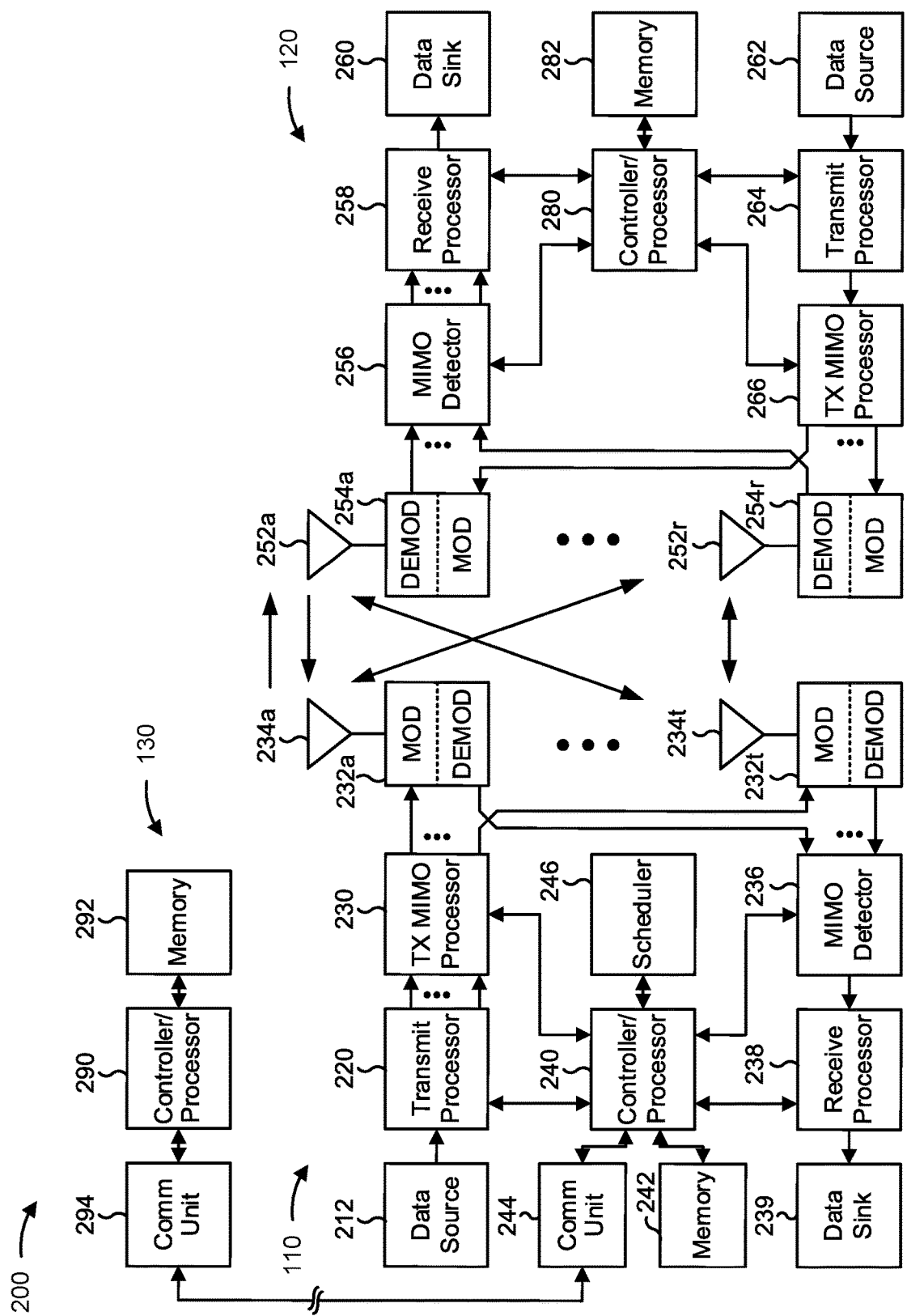
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a differential reporting mode for amplitude and/or co-phase, as described in more detail elsewhere herein. For example, controller/processor 240 of base station 110, controller/processor 280 of UE 120, and/or any other component(s) of FIG. 2 may perform or direct operations of, for example, process 1600 of FIG. 16, process 1700 of FIG. 17, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining to use a differential reporting mode based at least in part on a channel state information (CSI) report to be transmitted to BS 110, wherein the differential reporting mode is associated with reporting an amplitude differential or a co-phase differential for a set of channels; means for transmitting, to BS 110, the CSI report to indicate to BS 110 that UE 120 is to use the differential reporting mode; means for transmitting, to BS 110, a report based at least in part on transmitting the CSI report to BS 110, wherein the report includes information identifying the amplitude differential or the co-phase differential; means for receiving, from BS 110, a physical downlink shared channel (PDSCH) communication via a precoder that is based at least in part on the amplitude differential or the co-phase differential identified in the report; means for receiving, from BS 110, signaling that indicates that UE 120 is to adjust a step size of the amplitude differential or the co-phase differential based at least in part on transmitting the CSI report; means for adjusting the amplitude differential or the co-phase differential based at least in part on receiving the signaling; means for transmitting, to BS 110, a report that indicates that the amplitude differential or the co-phase differential have been adjusted; means for receiving, from BS 110, downlink control information (DCI) based at least in part on receiving the signaling; and/or the like. In some aspects, such means may include one or more components of UE 120 described in connection with FIG. 2.

In some aspects, BS 110 may include means for determining that UE 120 is to use a differential reporting mode based at least in part on a CSI report from UE 120, wherein the differential reporting mode is associated with reporting an amplitude differential or a co-phase differential for a set of channels; means for transmitting, to UE 120, signaling to cause UE 120 to use the differential reporting mode based at least in part on determining that UE 120 is to use the differential reporting mode; means for receiving a report from UE 120 based at least in part on transmitting the signaling to UE 120, wherein the report includes information identifying the amplitude differential or the co-phase differential; means for determining a precoder based at least in part on receiving the report, wherein the precoder is based at least in part on the amplitude differential or the co-phase differential identified in the report; means for transmitting, to UE 120, a PDSCH communication using the precoder; means for determining whether the amplitude differential or the co-phase differential will converge to real values for an amplitude or a co-phase based at least in part on transmitting the PDSCH communication; means for selectively adjusting or maintaining a step size for the amplitude differential or the co-phase differential based at least in part on determining whether the amplitude differential or the co-phase differential will converge to real values for the amplitude or the co-phase; means for transmitting, to UE 120 and when the step size is adjusted, additional signaling to indicate the step size for the amplitude differential or the co-phase differential based at least in part on adjusting the step size; means for transmitting, to UE 120, downlink control information (DCI) based at least in part on determining that the amplitude differential or the co-phase differential will not converge to the real values for the amplitude or the co-phase; means for scanning a channel state information reference signal (CSI-RS) using another precoder that corresponds to the time index; and/or the like. In some aspects, such means may include one or more components of base station 110 described in connection with FIG. 2.

As indicated above, FIG. 2 is provided as an example. Other examples may differ from what is described with regard to FIG. 2.

Figure 3A:
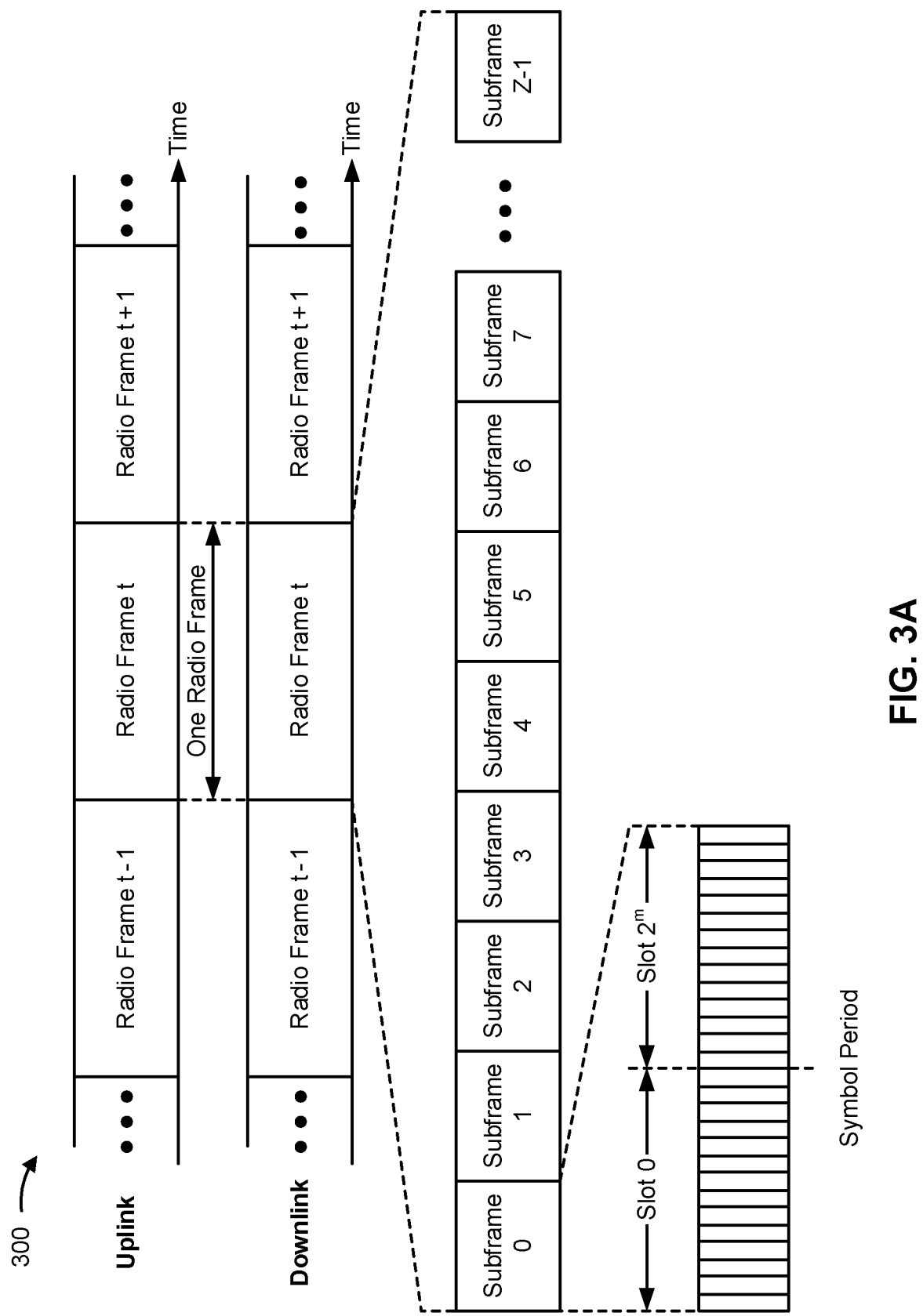
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., $2^m$ slots per subframe are shown in FIG. 3A, where m is a numerology used for a transmission, such as 0, 1,2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
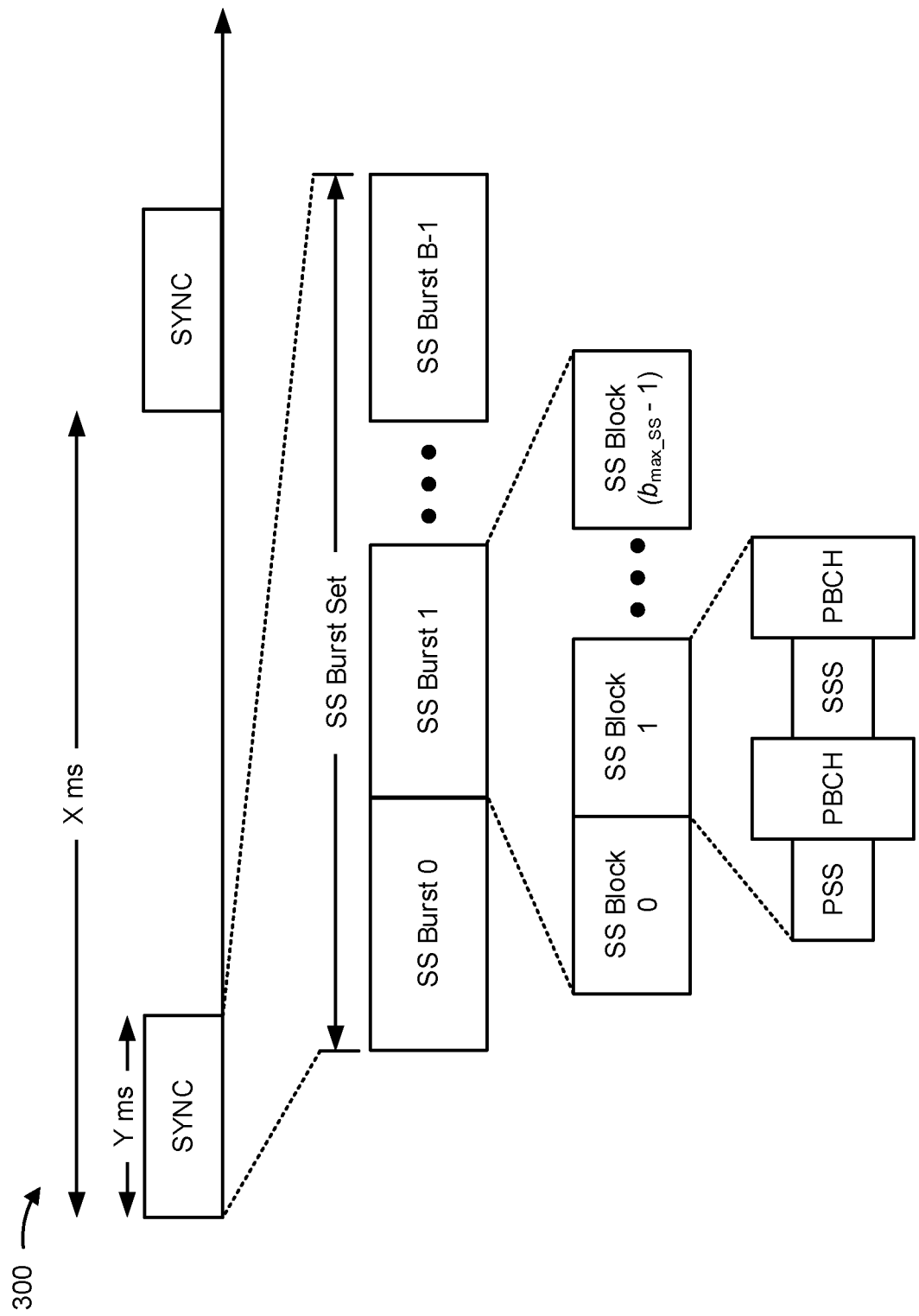
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block (borax SS-1), where $b_{max\_SS}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBS) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
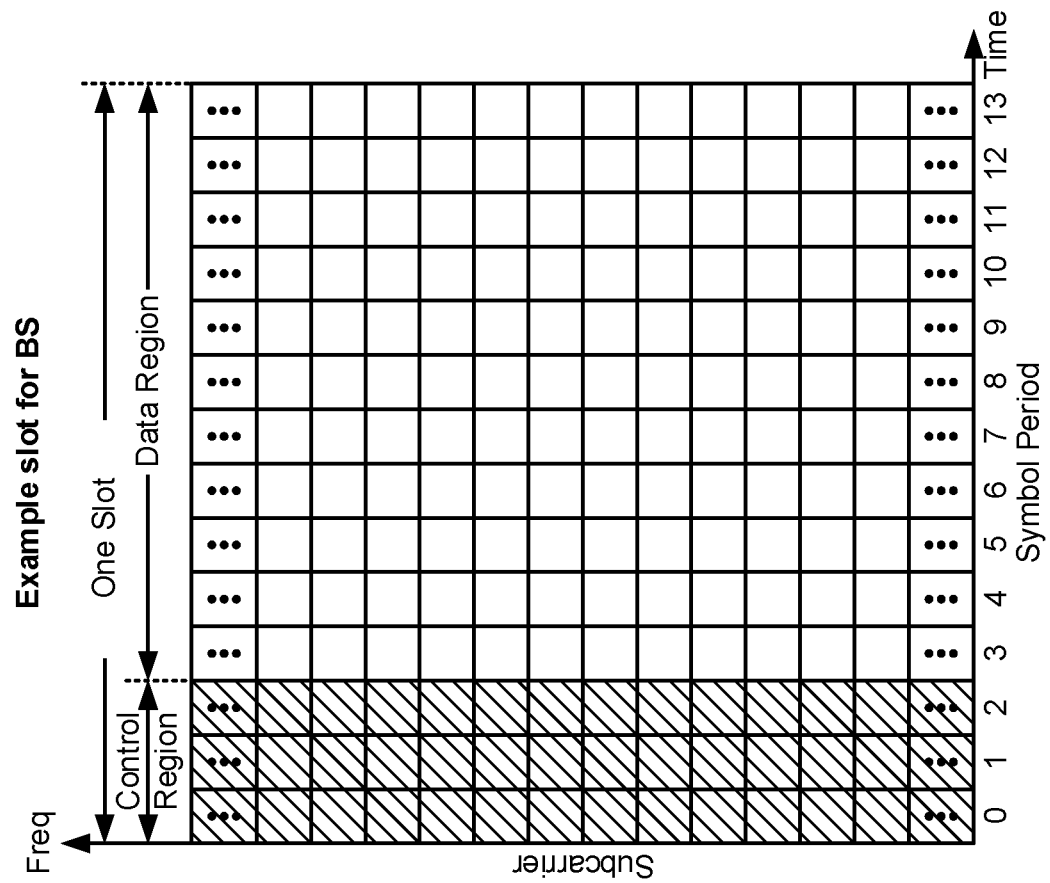
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, and/or the like, where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
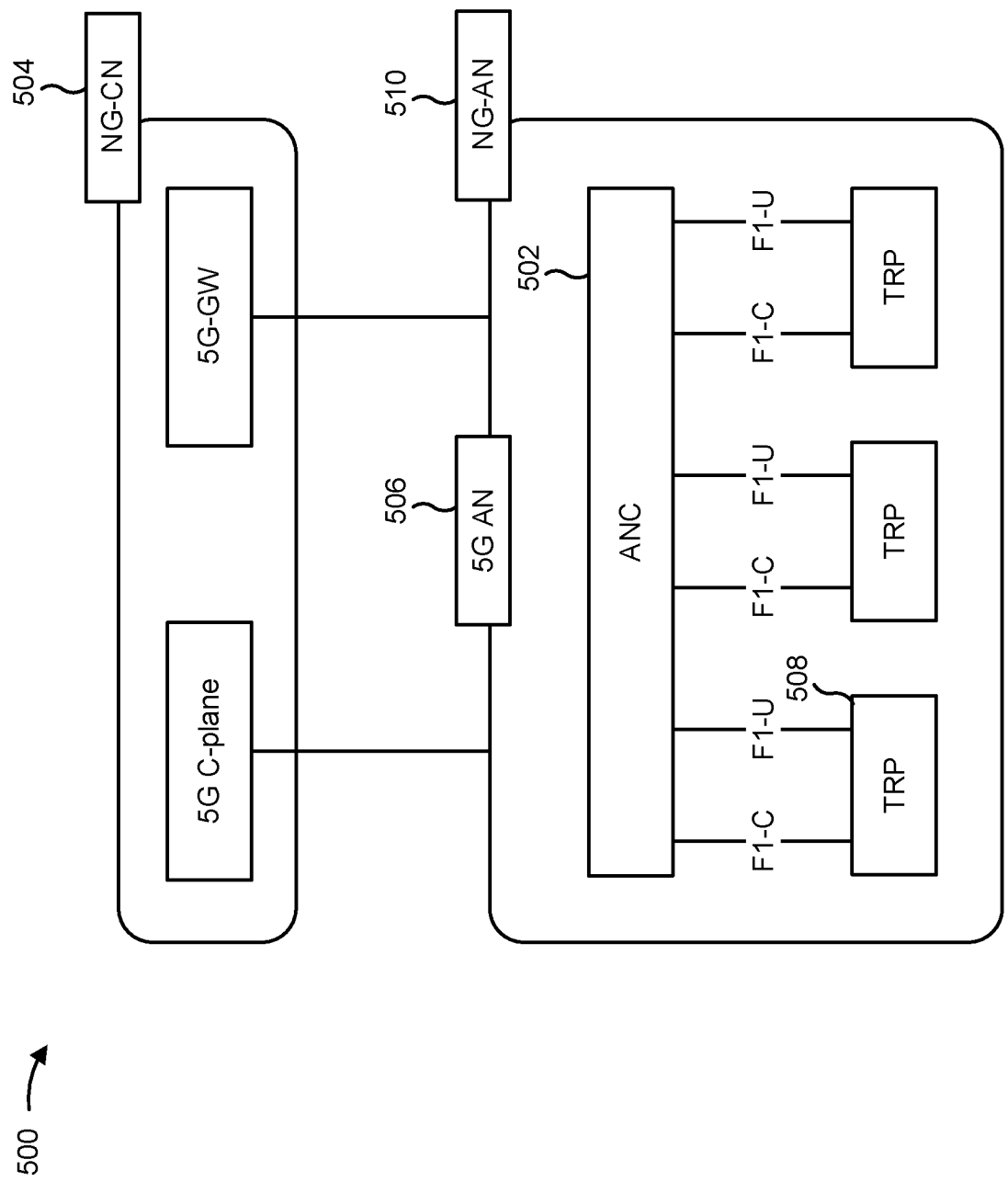
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
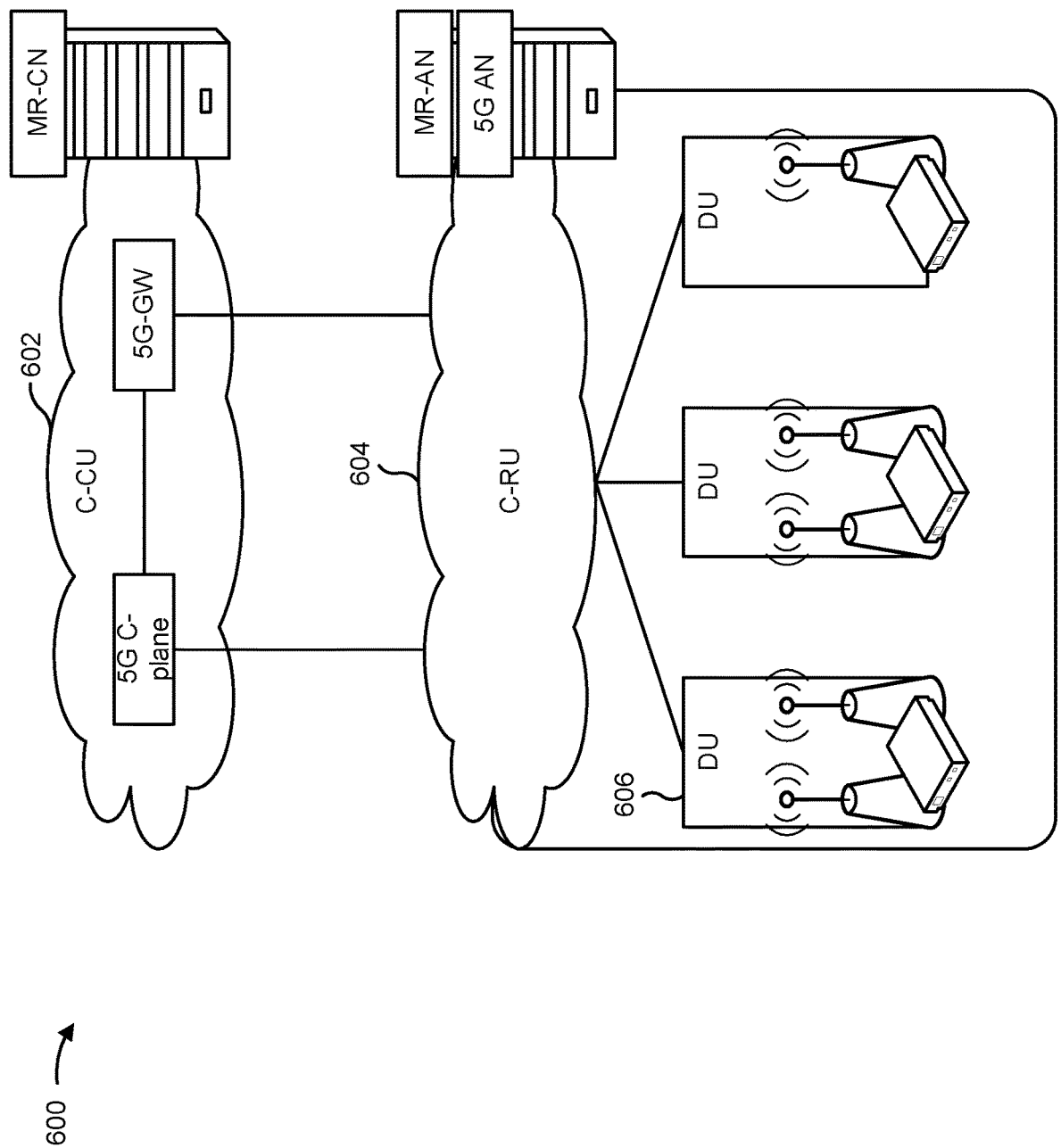
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

Figure 7:
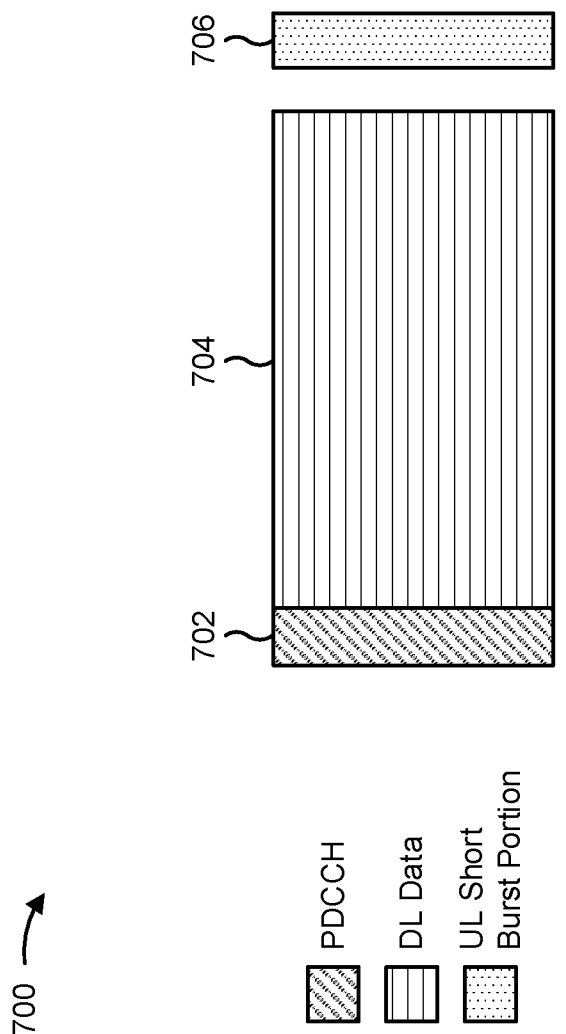
FIG. 7 is a diagram illustrating an example of a downlink (DL)-centric slot, in accordance with various aspects of the present disclosure.

FIG. 7 is a diagram 700 showing an example of a DL-centric slot or wireless communication structure. The DL-centric slot may include a control portion 702. The control portion 702 may exist in the initial or beginning portion of the DL-centric slot. The control portion 702 may include various scheduling information and/or control information corresponding to various portions of the DL-centric slot. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PC-FICH)), one or more grants (e.g., downlink grants, uplink grants, and/or the like), and/or the like.

The DL-centric slot may also include a DL data portion 704. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric slot may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric slot. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 7 is provided as an example. Other examples may differ from what is described with regard to FIG. 7.

Figure 8:
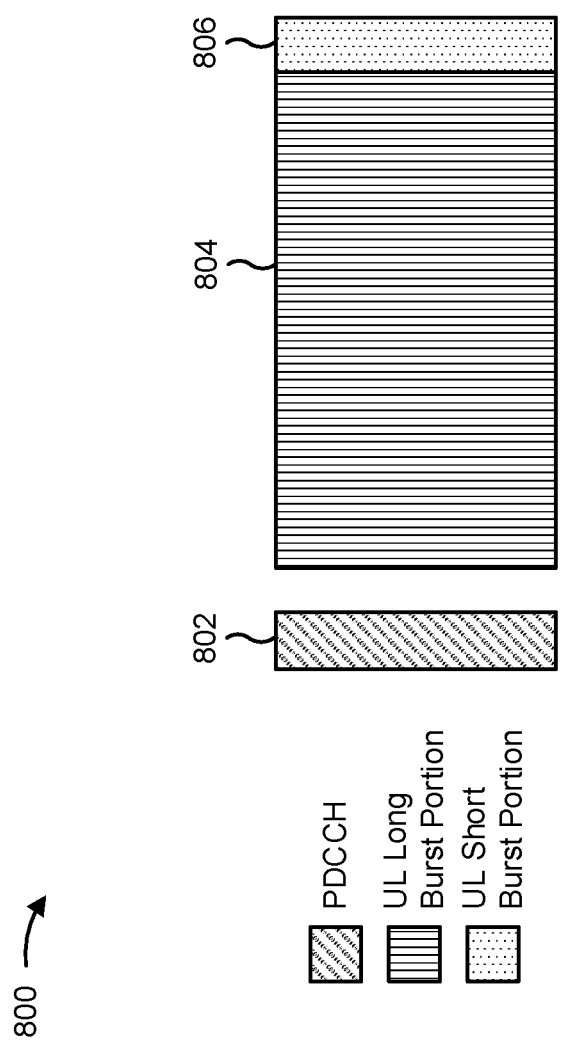
FIG. 8 is a diagram illustrating an example of an uplink (UL)-centric slot, in accordance with various aspects of the present disclosure.

FIG. 8 is a diagram 800 showing an example of an UL-centric slot or wireless communication structure. The UL-centric slot may include a control portion 802. The control portion 802 may exist in the initial or beginning portion of the UL-centric slot. The control portion 802 in FIG. 8 may be similar to the control portion 702 described above with reference to FIG. 7. The UL-centric slot may also include an UL long burst portion 804. The UL long burst portion 804 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 806. The UL short burst portion 806 in FIG. 8 may be similar to the UL short burst portion 706 described above with reference to FIG. 7, and may include any of the information described above in connection with FIG. 7. The foregoing is one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 8 is provided as an example. Other examples may differ from what is described with regard to FIG. 8.

A UE may use New Radio (NR) Type II reporting (e.g., CSI Type II reporting) to report an amplitude and/or a co-phase to a BS (e.g., for a beam, a layer, and/or the like). A total payload size (e.g., in terms of bits) for the NR Type II reporting may be based at least in part on amplitude and/or co-phase values used by the UE, a quantity of widebands and/or a quantity of sub-bands for which the NR Type II reporting is associated, a quantity of amplitude and/or co-phase values reported by the UE, and/or the like. For example, the total payload of NR Type II reporting may be greater than 100 bits (and over 500 bits in some cases) for a single wideband and 10 sub-bands. Transmitting this large of a payload in association with NR Type II reporting consumes significant network resources (e.g., bandwidth), results in a large amount of overhead for communications between the UE and a BS, and/or the like. This can be problematic in low latency scenarios, where large amounts of overhead and/or large payload sizes can impede communications by slowing processing of the communications.

Some techniques and apparatuses described herein provide for use of a differential reporting mode. For example, a UE may report a differential from a previous amplitude and/or co-phase rather than reporting an actual amplitude and/or a co-phase value. Reporting an amplitude differential and/or a co-phase differential rather than an amplitude and/or a co-phase value reduces a size of a payload transmitted to a BS (e.g., a differential value with regard to an amplitude and/or a co-phase is likely to be smaller than an actual value of an amplitude and/or a co-phase). This conserves network resources (e.g., bandwidth) that would otherwise be consumed using NR Type II reporting. In addition, reporting differential values reduces latency that would otherwise occur due to a large amount of overhead in communications between the UE and the BS, thereby improving communications between the UE and the BS.

Figure 9:
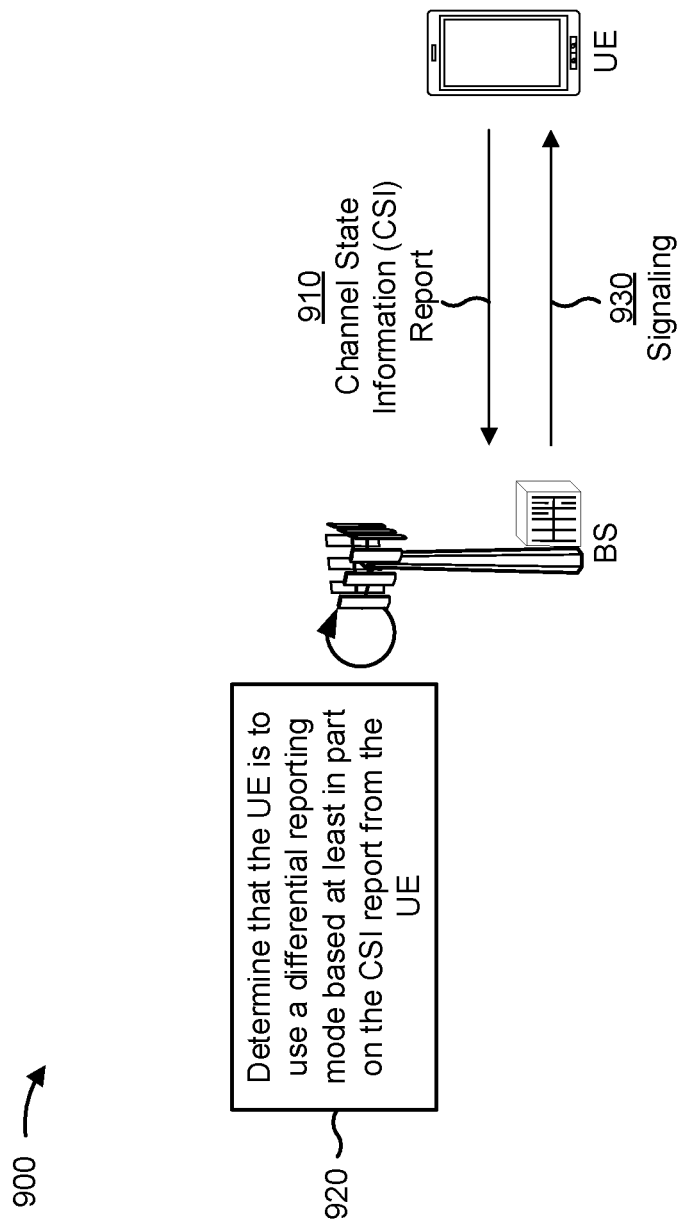
FIGS. 9-15B are diagrams illustrating one or more examples of a differential reporting mode for amplitude and/or co-phase, in accordance with various aspects of the present disclosure.

FIG. 9 is a diagram illustrating an example 900 of a differential reporting mode for amplitude and/or co-phase, in accordance with various aspects of the present disclosure. For example, FIG. 9 shows an example of a BS triggering a differential reporting mode for amplitude and/or co-phase. As shown in FIG. 9, example 900 includes a BS (e.g., BS 110) and a UE (e.g., UE 120).

As shown by reference number 910, the UE may transmit, and the BS may receive, a CSI report. For example, the UE may transmit the CSI report prior to using a differential reporting mode. In some aspects, the UE may be a low time-variance UE, such as a low tier UE, a particular category UE (e.g., Cat-M), an Internet of Things (IoT) UE, and/or the like.

As shown by reference number 920, the BS may determine that the UE is to use a differential reporting mode based at least in part on the CSI report from the UE. For example, the BS may determine that the UE is to use a differential reporting mode after receiving the CSI report from the UE. In some aspects, the BS may determine that the UE is to use the differential reporting mode based at least in part on the CSI report indicating that the UE has low time-variance properties (e.g., is a low tier UE, is an IoT UE, and/or the like).

The differential reporting mode may be associated with reporting an amplitude differential and/or a co-phase differential for a set of channels. For example, when using the differential reporting mode, the UE may report an amplitude differential and/or a co-phase differential, rather than an amplitude and/or a co-phase (e.g., rather than reporting actual values for the amplitude and/or the co-phase). The amplitude differential may be in relation to a previous amplitude value (e.g., a difference from the previous amplitude value) or a previous amplitude differential (e.g., a difference from the previous amplitude differential). Similarly, the co-phase differential may be in relation to a previous co-phase value (e.g., a difference from the previous co-phase value) or a previous co-phase differential (e.g., a difference from the previous co-phase differential).

As shown by reference number 930, the BS may transmit, and the UE may receive, signaling to cause the UE to use the differential reporting mode based at least in part on determining that the UE is to use the differential reporting mode. For example, the BS may transmit the signaling after determining that the UE is to use the differential reporting mode, to cause the UE to use the differential reporting mode, and/or the like. In some aspects, the signaling may be radio resource control (RRC) signaling.

In some aspects, various bits of the signaling may be used to indicate information related to the differential reporting mode to the UE. For example, one bit of the signaling may be used to indicate that the UE is to use the differential reporting mode (e.g., to cause the UE to use the differential reporting mode). Additionally, or alternatively, and as another example, two bits of the signaling may be used to indicate a step size of the co-phase differential that the UE is to use. Additionally, or alternatively, and as another example, two bits of the signaling may be used to indicate a step size for the amplitude differential that the UE is to use. Additional details regarding step size signaling are described below in connection with FIG. 13.

In some aspects, the UE may transmit, and the BS may receive, a report associated with the differential reporting mode. For example, the UE may transmit the report based at least in part on receiving the signaling from the BS and based at least in part on using the differential reporting mode. The report may include information identifying the amplitude differential of the UE and/or the co-phase differential of the UE. In some aspects, after receiving the report from the UE, the BS may accumulate the amplitude differential and/or the co-phase differential. For example, the BS may determine an amplitude and/or a co-phase that the UE is reporting based at least in part on the amplitude differential and/or the co-phase differential (e.g., by adding or subtracting the amplitude differential and/or the co-phase differential from a previous amplitude value and/or a previous co-phase value).

In some aspects, after accumulating the amplitude differential and/or the co-phase differential, the BS may determine a precoder. For example, the BS may determine a precoder to be used for a downlink transmission. The precoder may be based at least in part on the amplitude differential and/or the co-phase differential. In some aspects, the BS may transmit, and the UE may receive, a PDSCH communication based at least in part on determining the precoder. For example, the BS may transmit the PDSCH communication using the precoder.

In some aspects, based at least in part on transmitting the PDSCH communication, the BS may determine whether the amplitude differential and/or the co-phase differential will converge to real values for an amplitude and/or a co-phase. For example, the BS may determine whether the amplitude differential and/or the co-phase differential will converge to the real values after a threshold quantity of slots associated with the PDSCH communication have been acknowledged as successful by the UE (e.g., via a HARQ process).

If the BS determines that the amplitude differential and/or the co-phase differential will converge to the real values (e.g., will yield values on a curve of actual amplitude values and/or co-phase values based at least in part on a step size of the amplitude differential and/or the co-phase differential), the BS may determine to maintain a step size of the amplitude differential and/or the co-phase differential. For example, the BS may determine to not modify a step size of the amplitude differential and/or the co-phase differential as indicated to the UE in the signaling described above. Conversely, if the BS determines that the amplitude differential and/or the co-phase differential will not converge to the real values (e.g., will fail to yield values on a curve of actual amplitude values and/or co-phase values based at least in part on a step size of the amplitude differential and/or the co-phase differential), the BS may adjust a step size of the amplitude differential and/or the co-phase differential such that the amplitude differential and/or the co-phase differential will converge to the real values. In this case, the BS may transmit, and the UE may receive, additional signaling to indicate the adjusted step size for the amplitude differential and/or the co-phase differential.

Additionally, or alternatively, the BS may transmit, and the UE may receive, downlink control information (DCI) based at least in part on determining that the amplitude differential and/or the co-phase differential will not converge to the real values. For example, the DCI may include information that indicates that the report from the UE includes an error (e.g., that the amplitude differential and/or the co-phase differential will not converge to the real values). Additionally, or alternatively, and as another example, the DCI may include information that indicates a time index (e.g., slot index) of a last successful downlink transmission to the UE to cause the UE to transmit a CSI reference signal (CSI-RS) using a precoder corresponding to the time index. In this case, the BS may perform scanning of the CSI-RS using the precoder that corresponds to the time index and may perform one or more operations described herein after detecting the CSI-RS.

As indicated above, FIG. 9 is provided as an example. Other examples may differ from what is described with respect to FIG. 9.

Figure 10:
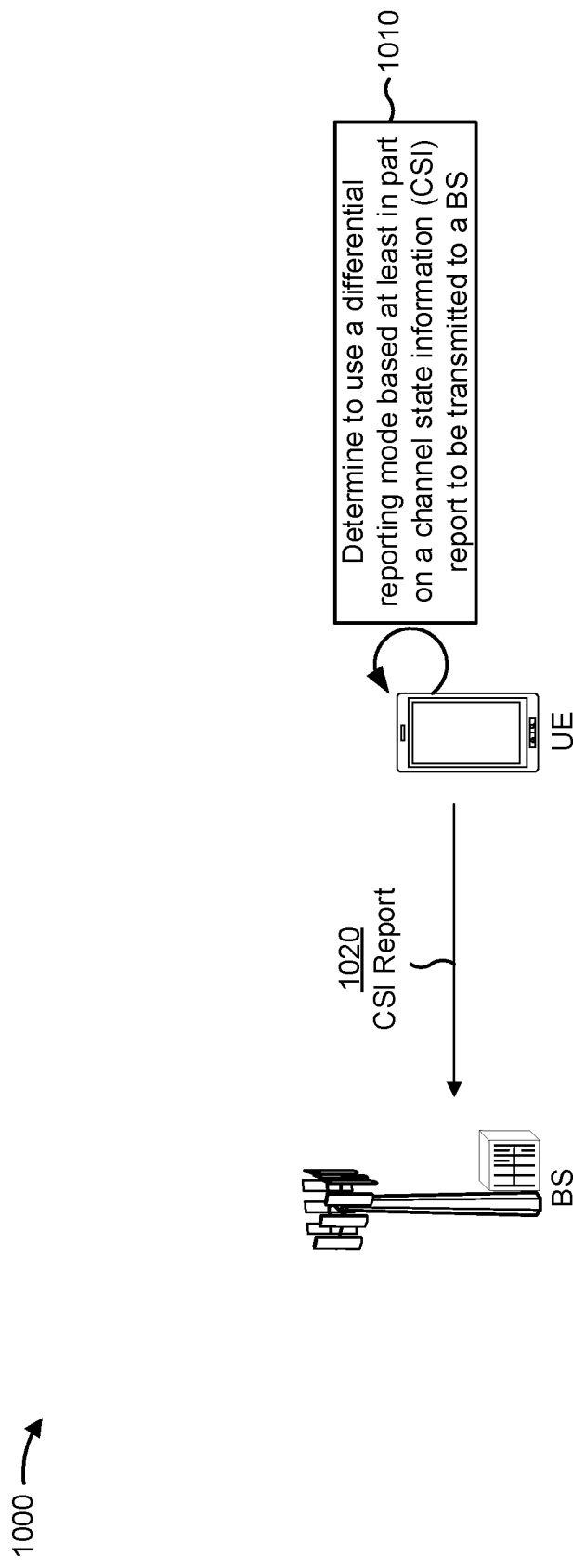

FIG. 10 is a diagram illustrating an example 1000 of a differential reporting mode for amplitude and/or co-phase, in accordance with various aspects of the present disclosure. For example, FIG. 10 shows an example of a UE requesting a differential reporting mode for amplitude and/or co-phase. As shown in FIG. 10, example 1000 includes a BS (e.g., BS 110) and a UE (e.g., UE 120).

As shown by reference number 1010, the UE may determine to use a differential reporting mode based at least in part on a CSI report to be transmitted to a BS. For example, the UE may determine to use the differential reporting mode based at least in part on the UE being, or the CSI report indicating, that the UE is a low time-variance UE, such as a low tier UE, an Internet of Things (IoT) UE, and/or the like. The differential reporting mode may be similar to that described elsewhere herein (e.g., may be associated with reporting an amplitude differential and/or a co-phase differential).

As shown by reference number 1020, the UE may transmit, and the BS may receive, the CSI report. For example, the UE may transmit the CSI report based at least in part on determining to use the differential reporting mode. The CSI report may be associated with indicating to the BS that that the UE is to use the differential reporting mode.

In some aspects, various bits of the CSI report may be used to indicate information related to the differential reporting mode to the BS. For example, one bit of the CSI report may be used to indicate that the UE is to use the differential reporting mode (e.g., to request use of the differential reporting mode). Additionally, or alternatively, and as another example, two bits of the signaling may be used to indicate a step size of the co-phase differential that the UE is to use. Additionally, or alternatively, and as another example, two bits of the signaling may be used to indicate a step size for the amplitude differential that the UE is to use. Additionally, or alternatively, and as another example, one bit of the CSI report may be used to indicate the amplitude differential for a wideband. Additionally, or alternatively, and as another example, one bit of the CSI report may be used to indicate the amplitude differential and/or the co-phase differential for a sub-band.

The UE may transmit, and the BS may receive, a report similar to that described elsewhere herein after transmitting the CSI report to the BS. For example, the report may include information that identifies an amplitude differential and/or a co-phase differential for the UE. In some aspects, the BS may use the report in a manner similar to that described elsewhere herein. For example, the BS may determine a precoder based at least in part on the amplitude differential and/or the co-phase differential, may transmit a PDSCH communication to the UE based at least in part on the precoder, may transmit signaling to indicate an adjustment to an amplitude differential and/or a co-phase differential, and/or the like.

As indicated above, FIG. 10 is provided as an example. Other examples may differ from what is described with respect to FIG. 10.

Figure 11:
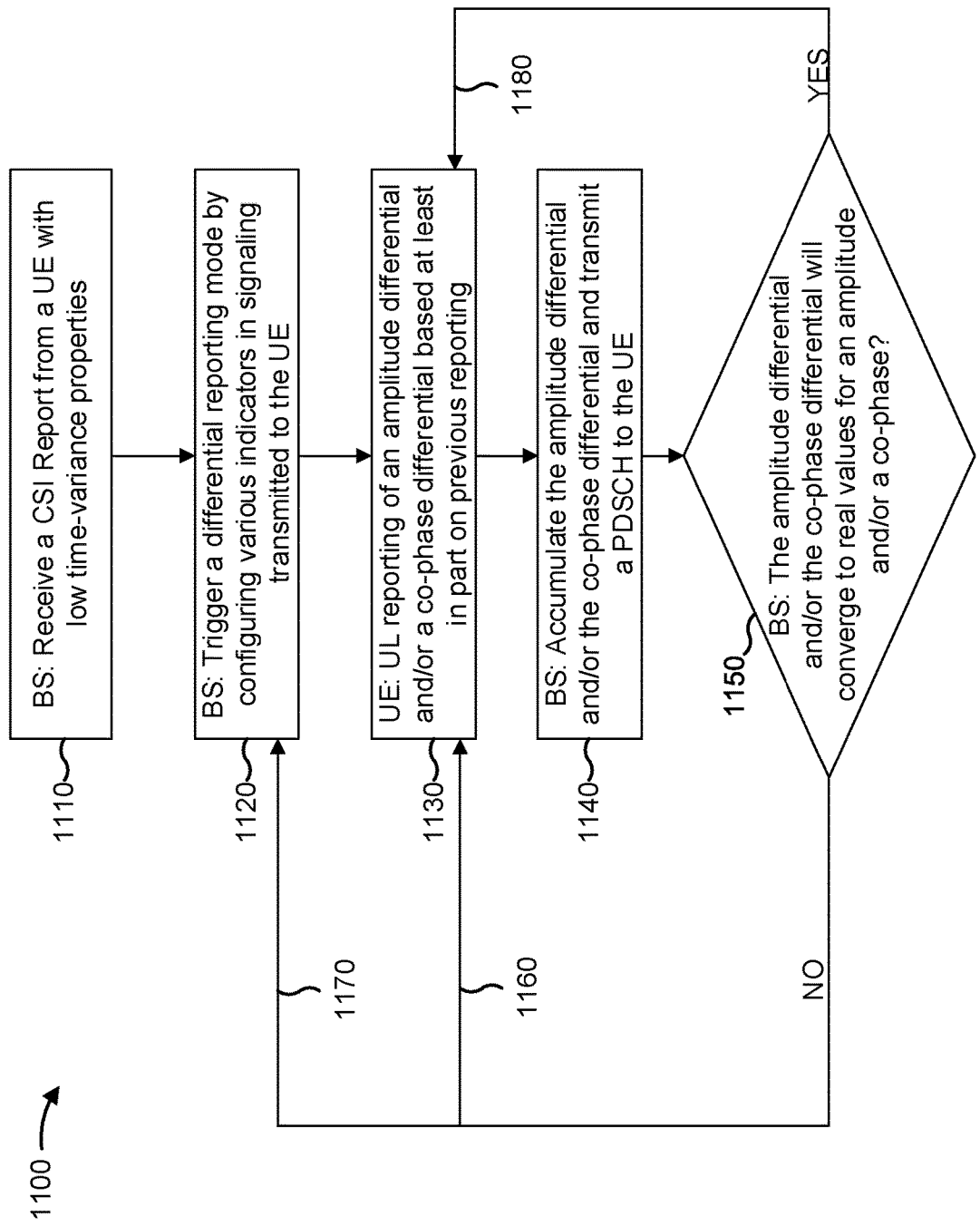

FIG. 11 is a diagram illustrating an example 1100 of a differential reporting mode for amplitude and/or co-phase, in accordance with various aspects of the present disclosure. FIG. 11 shows an example of a BS triggering a differential reporting mode for amplitude and/or co-phase.

As shown by reference number 1110, a BS (e.g., BS 110) may receive a CSI report from a UE (e.g., UE 120) with low time-variance properties. For example, the BS may receive the CSI report in a manner that is the same as or similar to that described elsewhere herein. As shown by reference number 1120, the BS may trigger a differential reporting mode by configuring various indicators in signaling transmitted to the UE. For example, the BS may trigger the differential reporting mode by configuring various one bit or two bit indicators in RRC signaling transmitted to the UE in a manner that is the same as or similar to that described elsewhere herein.

As shown by reference number 1130, the UE may perform UL reporting of an amplitude differential and/or a co-phase differential based at least in part on previous reporting. For example, the UE may transmit, and the BS may receive, a report that indicates an amplitude differential and/or a co-phase differential for the UE based at least in part on a previous amplitude and/or a previous co-phase reported to the BS or based at least in part on a previous amplitude differential and/or a previous co-phase differential reported to the BS, in a manner that is the same as or similar to that described elsewhere herein.

As shown by reference number 1140, the BS may accumulate the amplitude differential and/or the co-phase differential and may transmit a PDSCH communication to the UE. For example, the BS may determine an amplitude and/or a co-phase based at least in part on the amplitude differential and/or the co-phase differential, may determine a precoder based at least in part on the amplitude and/or the co-phase, and may transmit a PDSCH communication using the precoder, in a manner that is the same as or similar to that described elsewhere herein.

As shown by reference number 1150, the BS may determine whether the amplitude differential and/or the co-phase differential will converge to real values for an amplitude and/or a co-phase. For example, the BS may determine whether the amplitude differential and/or the co-phase differential will converge to the real values in a manner that is the same as or similar to that described elsewhere herein. As shown by reference number 1160, if the BS determines that the amplitude differential and/or the co-phase differential will not converge to the real values, then the UE may perform UL reporting after receiving DCI from the BS, after transmitting a CSI-RS to the BS, and/or the like in a manner that is the same as or similar to that described elsewhere herein. Additionally, or alternatively, and as shown by reference number 1170, if the BS determines that the amplitude differential and/or the co-phase differential will not converge to the real values, then the BS may trigger the differential reporting mode after adjusting a step size of the amplitude differential and/or the co-phase differential, after transmitting additional signaling to the UE, and/or the like in a manner that is the same as or similar to that described elsewhere herein.

As shown by reference number 1180, if the BS determines that the amplitude differential and/or the co-phase differential will converge to the real values, then the UE may continue to perform UL reporting. For example, the UE may continue performing UL reporting using a particular step size for an amplitude differential and/or a co-phase differential.

As indicated above, FIG. 11 is provided as an example. Other examples may differ from what is described with respect to FIG. 11.

Figure 12:
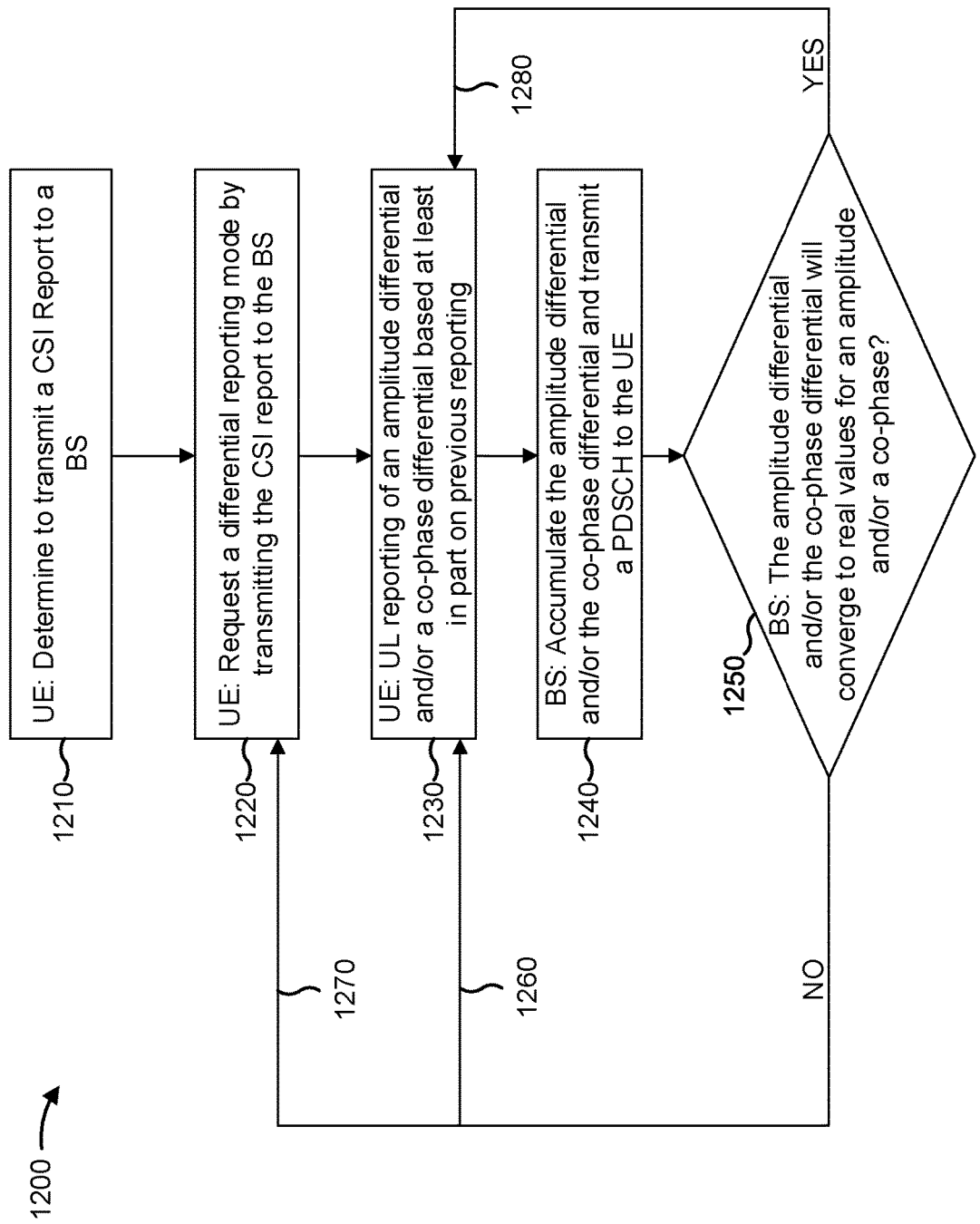

FIG. 12 is a diagram illustrating an example 1200 of a differential reporting mode for amplitude and/or co-phase, in accordance with various aspects of the present disclosure. FIG. 12 shows an example of a UE requesting a differential reporting mode for amplitude and/or co-phase.

As shown by reference number 1210, a UE (e.g., UE 120) may determine to transmit a CSI report to a BS (e.g., BS 110). For example, the UE may determine to transmit the CSI report in a manner that is the same as or similar to that described elsewhere herein. As shown by reference number 1220, the UE may request a differential reporting mode by transmitting the CSI report to the BS. For example, the UE may request the differential reporting mode by configuring various one bit or two bit indicators in the CSI report and transmitting the CSI report to the BS in a manner that is the same as or similar to that described elsewhere herein.

As shown by reference number 1230, the UE may perform UL reporting of an amplitude differential and/or a co-phase differential based at least in part on previous reporting, in a manner that is the same as or similar to that described elsewhere herein. As shown by reference number 1240, the BS may accumulate amplitude differential and/or co-phase differential and may transmit a PDSCH communication to the UE, in a manner that is the same as or similar to that described elsewhere herein. As shown by reference number 1250, the BS may determine whether the amplitude differential and/or the co-phase differential will converge to real values for an amplitude and/or a co-phase, in a manner that is the same as or similar to that described elsewhere herein.

As shown by reference number 1260, if the BS determines that the amplitude differential and/or the co-phase differential will not converge to the real values, then the UE may perform UL reporting after receiving DCI from the BS, after transmitting a CSI-RS to the BS, and/or the like, in a manner that is the same as or similar to that described elsewhere herein. Additionally, or alternatively, and as shown by reference number 1270, if the BS determines that the amplitude differential and/or the co-phase differential will not converge to the real values, then the UE may request the differential reporting mode after receiving, from the BS, signaling that adjusts a step size of the amplitude differential and/or the co-phase differential, in a manner that is the same as or similar to that described elsewhere herein. As shown by reference number 1280, if the BS determines that the amplitude differential and/or the co-phase differential will converge to the real values, then the UE may continue to perform UL reporting, in a manner that is the same as or similar to that described elsewhere herein.

As indicated above, FIG. 12 is provided as an example. Other examples may differ from what is described with respect to FIG. 12.

Figure 13:
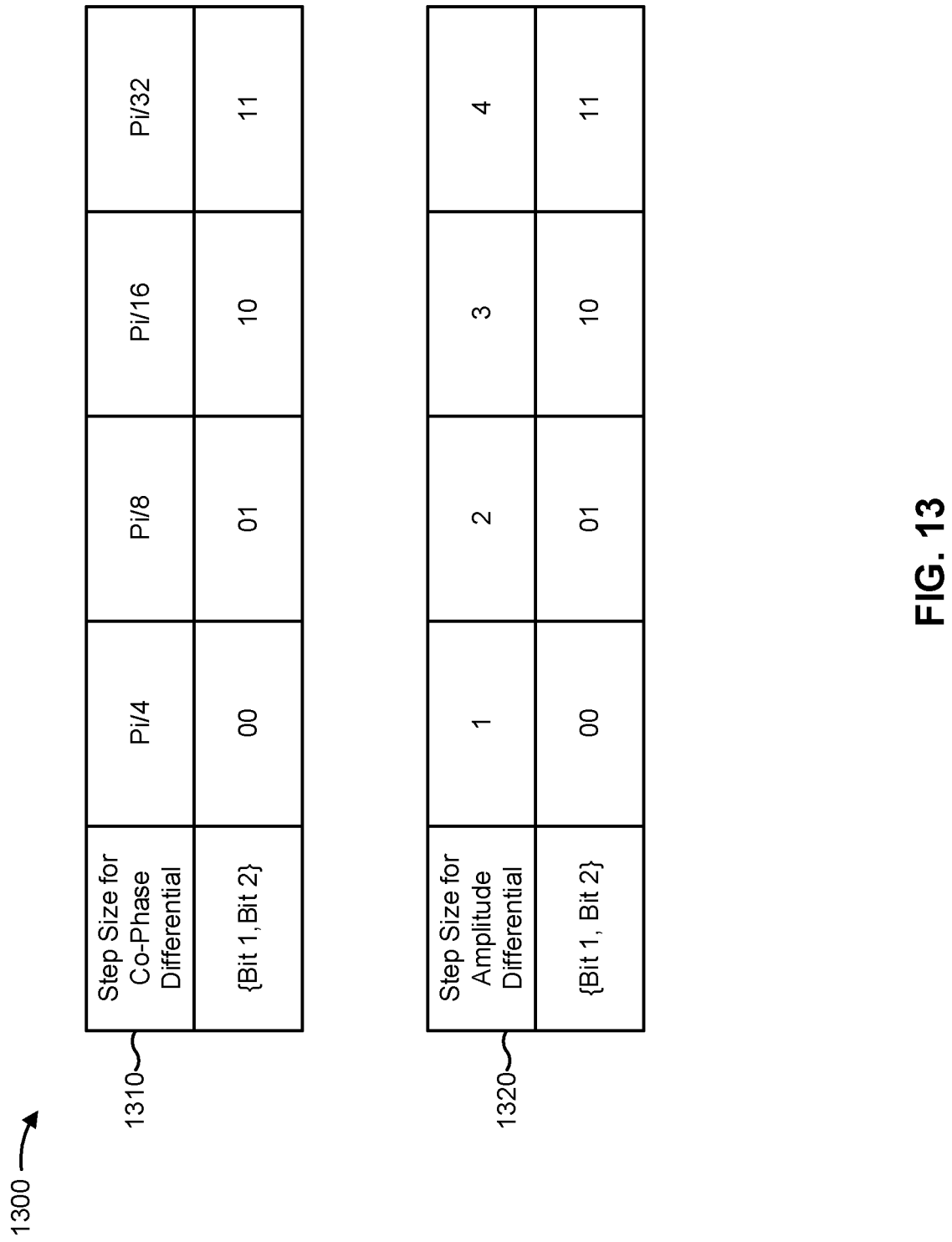

FIG. 13 is a diagram illustrating an example 1300 of a differential reporting mode for amplitude and/or co-phase, in accordance with various aspects of the present disclosure. FIG. 13 shows example values for various indicators (e.g., in signaling from a BS and/or in a CSI report from a UE) described herein.

Reference number 1310 shows example bit values of a two bit indictor that may be used to indicate a step size for a co-phase differential. For example, signaling from a BS (e.g., BS 110) and/or a CSI report from a UE (e.g., UE 120) may include a bit value of 00 for a two-bit indicator to indicate that a step size of the co-phase differential is Pi/4, a bit value of 01 for the two-bit indicator to indicate that the step size of the co-phase differential is Pi/8, a bit value of 10 for the two-bit indicator to indicate that the step size of the co-phase differential is Pi/16, or a bit value of 11 for the two-bit indicator to indicate that the step size of the co-phase differential is Pi/32. In this example, if the UE reports a value of 00, then this may indicate that the current co-phase differs from a previously reported co-phase by a value of Pi/4.

Reference number 1320 shows example bit values of a two bit indictor that may be used to indicate a step size for an amplitude differential. For example, signaling from a BS and/or a CSI report from a UE may include a bit value of 00 for a two-bit indicator to indicate that a step size of the amplitude differential is 1, a bit value of 01 for the two-bit indicator to indicate that the step size of the amplitude differential is 2, a bit value of 10 for the two-bit indicator to indicate that the step size of the amplitude differential is 3, or a bit value of 11 for the two-bit indicator to indicate that the step size of the amplitude differential is 4. In this example, if the UE reports a value of 00, then this may indicate that the current amplitude differs from a previously reported amplitude by a value of 1.

As indicated above, FIG. 13 is provided as an example. Other examples may differ from what is described with respect to FIG. 13.

Figure 14:
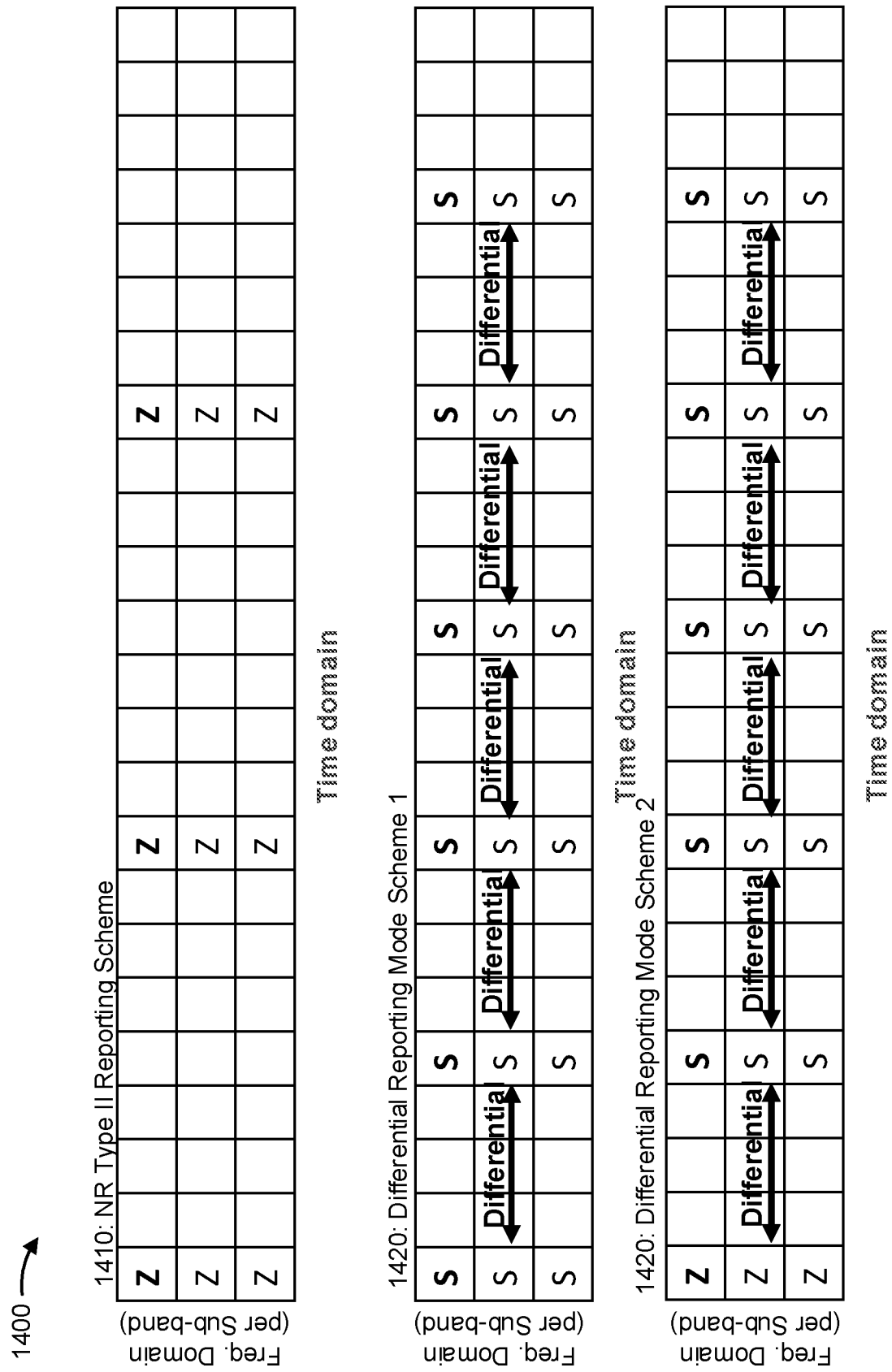

FIG. 14 is a diagram illustrating an example 1400 of a differential reporting mode for amplitude and/or co-phase, in accordance with various aspects of the present disclosure. FIG. 14 shows a comparison of a periodicity of an NR Type II reporting scheme and a periodicity of various differential reporting mode schemes.

Reference number 1410 shows a periodicity of an NR Type II reporting scheme. For example, a UE may report an amplitude and/or a co-phase every 8th symbol period (shown by "Z"). Reference number 1420 shows a periodicity of a first different reporting mode scheme ("Differential Reporting Mode Scheme 1"). Compared to the NR Type II reporting scheme, a UE may report an amplitude differential and/or a co-phase differential every 4th symbol period (shown by "S"). In addition, reference number 1420 shows that reporting of an amplitude differential and/or a co-phase differential may be in relation to a previous reporting of an amplitude differential and/or a co-phase differential (e.g., shown by "S" in the first reporting in the first symbol period and "S" in the next reporting).

Reference number 1430 shows a similar periodicity for a second differential reporting mode scheme ("Differential Reporting Mode Scheme 2"). Different from the first differential reporting mode scheme shown by reference number 1420, reference number 1430 shows that reporting of an amplitude differential and/or a co-phase differential may be in relation to a previous reporting of an amplitude and/or a co-phase (rather than in relation to a previous amplitude differential and/or a previous co-phase differential). This is shown by "Z" in the first reporting in the first symbol period and "S" in the next reporting.

Although FIG. 14 shows the differential reporting mode schemes as having a periodicity that is less than the NR Type II reporting scheme, the differential reporting mode schemes may have a periodicity that is equal to or greater than the NR Type II reporting scheme. In addition, and as described elsewhere herein, a reporting associated with a differential reporting mode (shown by "S") may have a smaller quantity of bits than an NR Type II reporting (shown by "Z"). This conserves network resources that would otherwise be consumed performing NR Type II reporting, reduces overhead, and/or the like. In addition, because the differential reporting mode is associated with reduced overhead relative to an NR Type II reporting, a UE may perform reporting more often, thereby resulting in more accurate and/or more timely information, which improves a beam, a layer, and/or the like configured for the UE. Improved configuration of a beam, a layer, and/or the like for the UE increases a throughput of communications between the UE and a BS, increases a reliability of communications between the UE and a BS, and/or the like.

As indicated above, FIG. 14 is provided as an example. Other examples may differ from what is described with respect to FIG. 14.

Figure 15A:
Figure 15B:
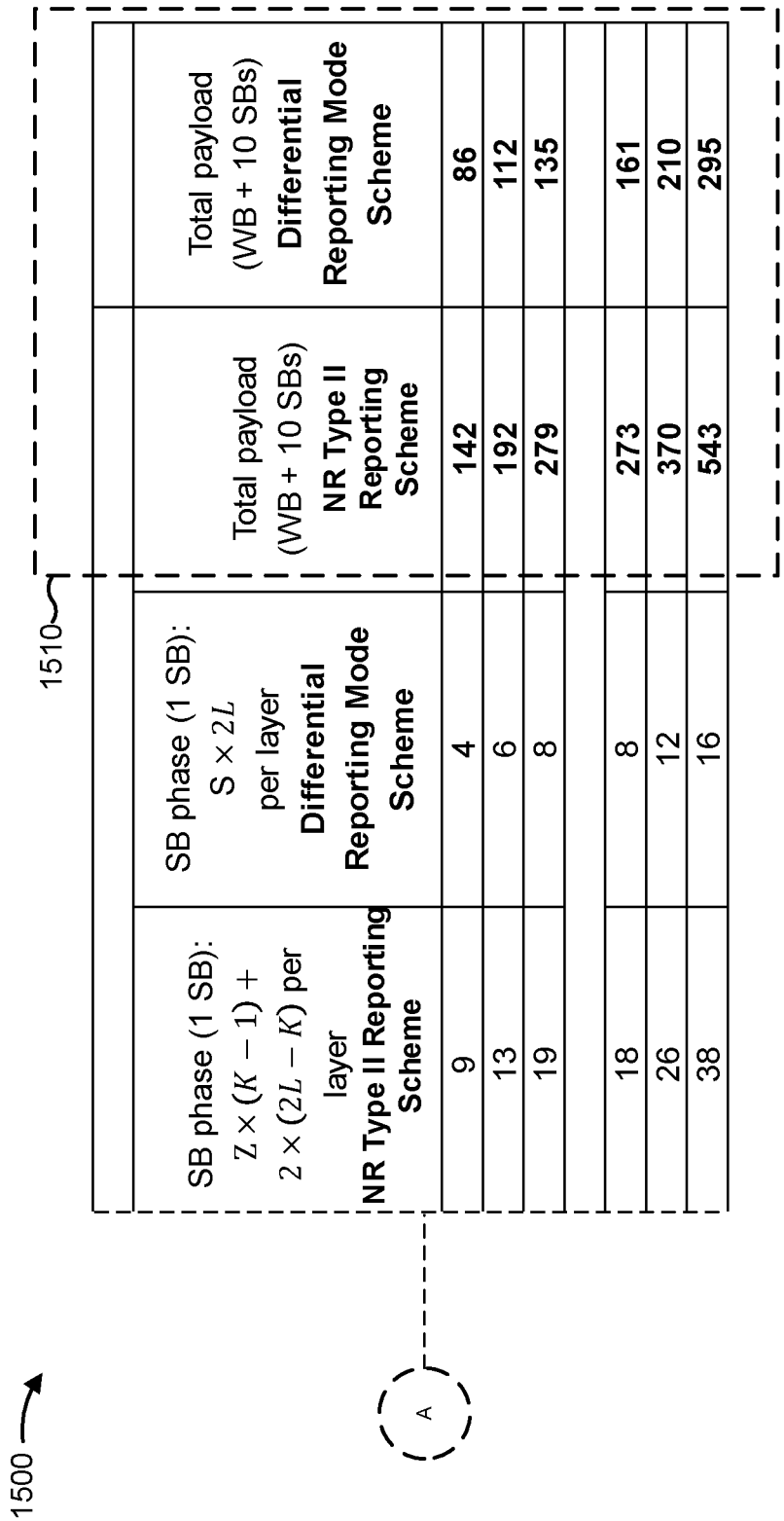

FIGS. 15A and 15B are diagrams illustrating one or more examples 1500 of a differential reporting mode for amplitude and/or co-phase, in accordance with various aspects of the present disclosure. FIGS. 15A and 15B show tables of example payload calculations for an NR Type II reporting scheme and a differential reporting mode scheme. As shown in FIG. 15B, and by reference number 1510, the differential reporting mode scheme may have a smaller payload (e.g., a smaller quantity of bits) relative to the NR Type II reporting scheme. This conserves bandwidth, processing resources, and/or the like that would otherwise be consumed with a larger payload.

As indicated above, FIGS. 15A and 15B are provided as one or more examples. Other examples may differ from what is described with respect to FIGS. 15A and 15B.

Figure 16:
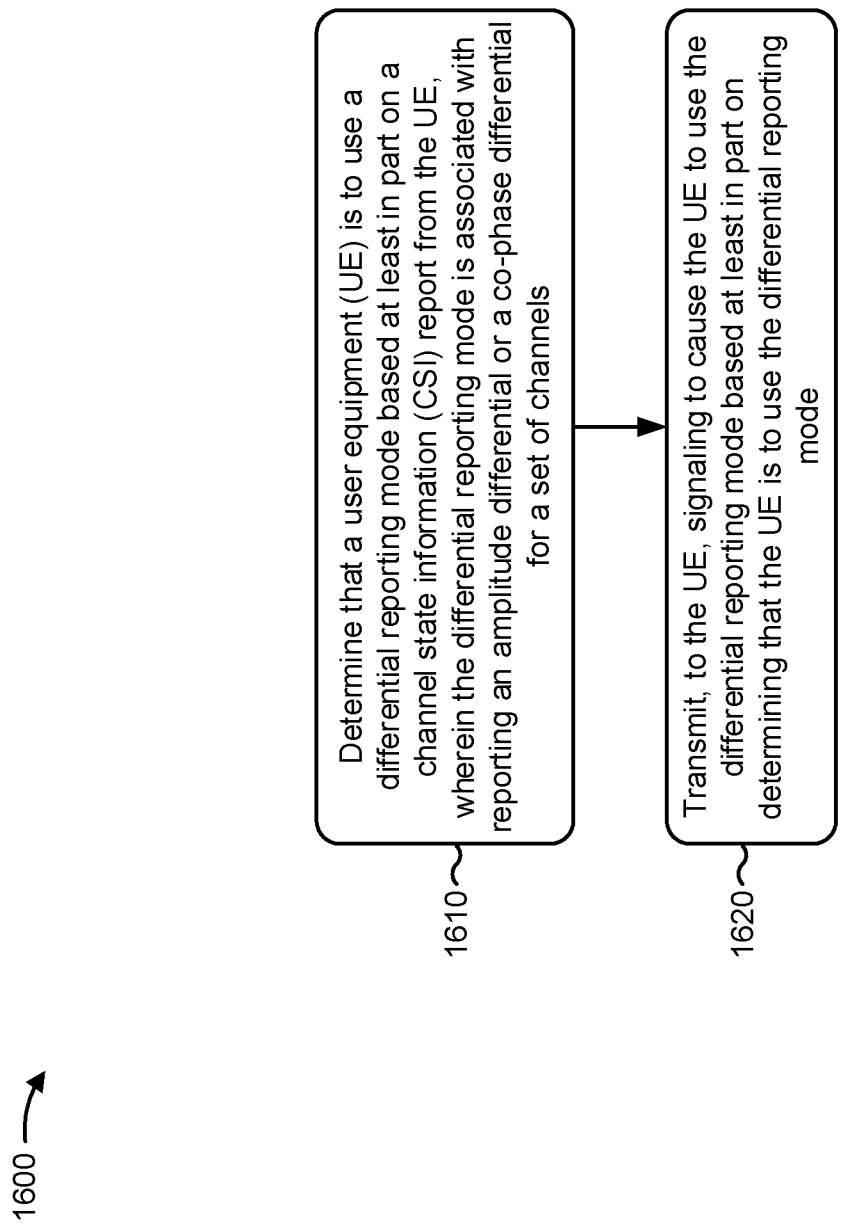
FIG. 16 is a diagram illustrating an example process performed, for example, by a BS, in accordance with various aspects of the present disclosure.

FIG. 16 is a diagram illustrating an example process 1600 performed, for example, by a base station (BS), in accordance with various aspects of the present disclosure. Example process 1600 is an example where a BS (e.g., BS 110 and/or the like) performs operations associated with a differential reporting mode for amplitude and/or co-phase.

As shown in FIG. 16, in some aspects, process 1600 may include determining that a user equipment (UE) is to use a differential reporting mode based at least in part on a channel state information (CSI) report from the UE, wherein the differential reporting mode is associated with reporting an amplitude differential or a co-phase differential for a set of channels (block 1610). For example, the BS (e.g., using controller/processor 240, and/or the like) may determine that a UE is to use a differential reporting mode based at least in part on a CSI report from the UE, as described above. In some aspects, the differential reporting mode is associated with reporting an amplitude differential or a co-phase differential for a set of channels.

As further shown in FIG. 16, in some aspects, process 1600 may include transmitting, to the UE, signaling to cause the UE to use the differential reporting mode based at least in part on determining that the UE is to use the differential reporting mode (block 1620). For example, the BS (e.g., using controller/processor 240, transmit processor 220, TX MIMO processor 230, MOD 232, antenna 234, and/or the like) may transmit, to the UE, signaling to cause the UE to use the differential reporting mode based at least in part on determining that the UE is to use the differential reporting mode, as described above.

Process 1600 may include additional aspects, such as any single aspect or any combination of aspects described below and/or in connection with one or more other processes described elsewhere herein.

In a first aspect, the signaling is radio resource control (RRC) signaling. In a second aspect, alone or in combination with the first aspect, one bit of the signaling is associated with causing the UE to use the differential reporting mode. In a third aspect, alone or in combination with one or more of the first and second aspects, two bits of the signaling are associated with indicating a step size for the co-phase differential. In a fourth aspect, alone or in combination with one or more of the first through third aspects, two bits of the signaling are associated with indicating a step size of the amplitude differential. In a fifth aspect, alone or in combination with one or more of the first through fourth aspects, the differential reporting mode has a periodicity for reporting that is less than or equal to a NR Type II reporting.

In a sixth aspect, alone or in combination with one or more of the first through fifth aspects, the signaling includes: a bit value of 00 for a two-bit indicator to indicate that a step size of the co-phase differential is Pi/4, a bit value of 01 for the two-bit indicator to indicate that the step size of the co-phase differential is Pi/8, a bit value of 10 for the two-bit indicator to indicate that the step size of the co-phase differential is Pi/16, or a bit value of 11 for the two-bit indicator to indicate that the step size of the co-phase differential is Pi/32. In a seventh aspect, alone or in combination with one or more of the first through sixth aspects, the signaling includes: a bit value of 00 for a two-bit indicator to indicate that a step size of the amplitude differential is 1, a bit value of 01 for the two-bit indicator to indicate that the step size of the amplitude differential is 2, a bit value of 10 for the two-bit indicator to indicate that the step size of the amplitude differential is 3, or a bit value of 11 for the two-bit indicator to indicate that the step size of the amplitude differential is 4.

In an eighth aspect, alone or in combination with one or more of the first through seventh aspects, the amplitude differential is in relation to a previous amplitude differential or a previous amplitude. In a ninth aspect, alone or in combination with one or more of the first through eighth aspects, the co-phase differential is in relation to a previous co-phase differential or a previous co-phase. In a tenth aspect, alone or in combination with one or more of the first through ninth aspects, a report associated with the differential reporting mode has a smaller quantity of bits than a NR Type II report.

In an eleventh aspect, alone or in combination with one or more of the first through tenth aspects, the BS may receive a report from the UE based at least in part on transmitting the signaling to the UE. In a twelfth aspect, alone or in combination with one or more of the first through eleventh aspects, the report includes information identifying the amplitude differential or the co-phase differential. In a thirteenth aspect, alone or in combination with one or more of the first through twelfth aspects, the BS may determine a precoder based at least in part on receiving the report. In a fourteenth aspect, alone or in combination with one or more of the first through thirteenth aspects, the precoder is based at least in part on the amplitude differential or the co-phase differential identified in the report. In a fifteenth aspect, alone or in combination with one or more of the first through fourteenth aspects, the BS may transmit, to the UE, a physical downlink shared channel (PDSCH) communication using the precoder.

In a sixteenth aspect, alone or in combination with one or more of the first through fifteenth aspects, the BS may determine whether the amplitude differential or the co-phase differential will converge to real values for an amplitude or a co-phase based at least in part on transmitting the PDSCH communication. In a seventeenth aspect, alone or in combination with one or more of the first through sixteenth aspects, the BS may determine to maintain a step size for the amplitude differential or the co-phase differential based at least in part on determining that the amplitude differential or the co-phase differential will converge to the real values for the amplitude or the co-phase.

In an eighteenth aspect, alone or in combination with one or more of the first through seventeenth aspects, the BS may adjust a step size for the amplitude differential or the co-phase differential based at least in part on determining that the amplitude differential or the co-phase differential will not converge to the real values for the amplitude or the co-phase. In a nineteenth aspect, alone or in combination with one or more of the first through eighteenth aspects, the BS may transmit, to the UE, additional signaling to indicate the step size for the amplitude differential or the co-phase differential based at least in part on adjusting the step size.

In a twentieth aspect, alone or in combination with one or more of the first through nineteenth aspects, the BS may transmit, to the UE, downlink control information (DCI) based at least in part on determining that the amplitude differential or the co-phase differential will not converge to the real values for the amplitude or the co-phase. In a twenty-first aspect, alone or in combination with one or more of the first through twentieth aspects, the DCI indicates that the report from the UE includes an error. In a twenty-second aspect, alone or in combination with one or more of the first through twenty-first aspects, the DCI indicates a time index of a last successful downlink transmission. In a twenty-third aspect, alone or in combination with one or more of the first through twenty-second aspects, the BS may perform scanning of a channel state information reference signal (CSI-RS) using another precoder that corresponds to the time index.

In a twenty-fourth aspect, alone or in combination with one or more of the first through twenty-third aspects, the differential reporting mode has a periodicity for reporting that is less than or equal to a periodicity for NR Type II reporting. In a twenty-fifth aspect, alone or in combination with one or more of the first through twenty-fourth aspects, the signaling includes at least one of: a bit value corresponding to a step size of the co-phase differential, or a bit value for a two-bit indicator corresponding to a step size of the amplitude differential.

In a twenty-sixth aspect, alone or in combination with one or more of the first through twenty-fifth aspects, the BS may selectively adjust or maintain a step size for the amplitude differential or the co-phase differential based at least in part on determining whether the amplitude differential or the co-phase differential will converge to real values for the amplitude or the co-phase; and transmit, to the UE and when the step size is adjusted, additional signaling to indicate the step size for the amplitude differential or the co-phase differential based at least in part on adjusting the step size.

In a twenty-seventh aspect, alone or in combination with one or more of the first through twenty-sixth aspects, the DCI indicates that the report includes an error. In a twenty-eighth aspect, alone or in combination with one or more of the first through twenty-seventh aspects, the BS may scan a channel state information reference signal (CSI-RS) using another precoder that corresponds to the time index.

In a twenty-ninth aspect, alone or in combination with one or more of the first through twenty-eighth aspects, the differential reporting mode has a periodicity for reporting that is less than or equal to a periodicity for NR Type II reporting. In a thirtieth aspect, alone or in combination with one or more of the first through twenty-ninth aspects, the BS may receive a report from the UE based at least in part on transmitting the signaling to the UE, wherein the report includes information identifying the amplitude differential or the co-phase differential. In a thirty-first aspect, alone or in combination with one or more of the first through thirtieth aspects, the BS may determine a precoder based at least in part on receiving the report, wherein the precoder is based at least in part on the amplitude differential or the co-phase differential identified in the report; and transmit, to the UE, a PDSCH communication using the precoder.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
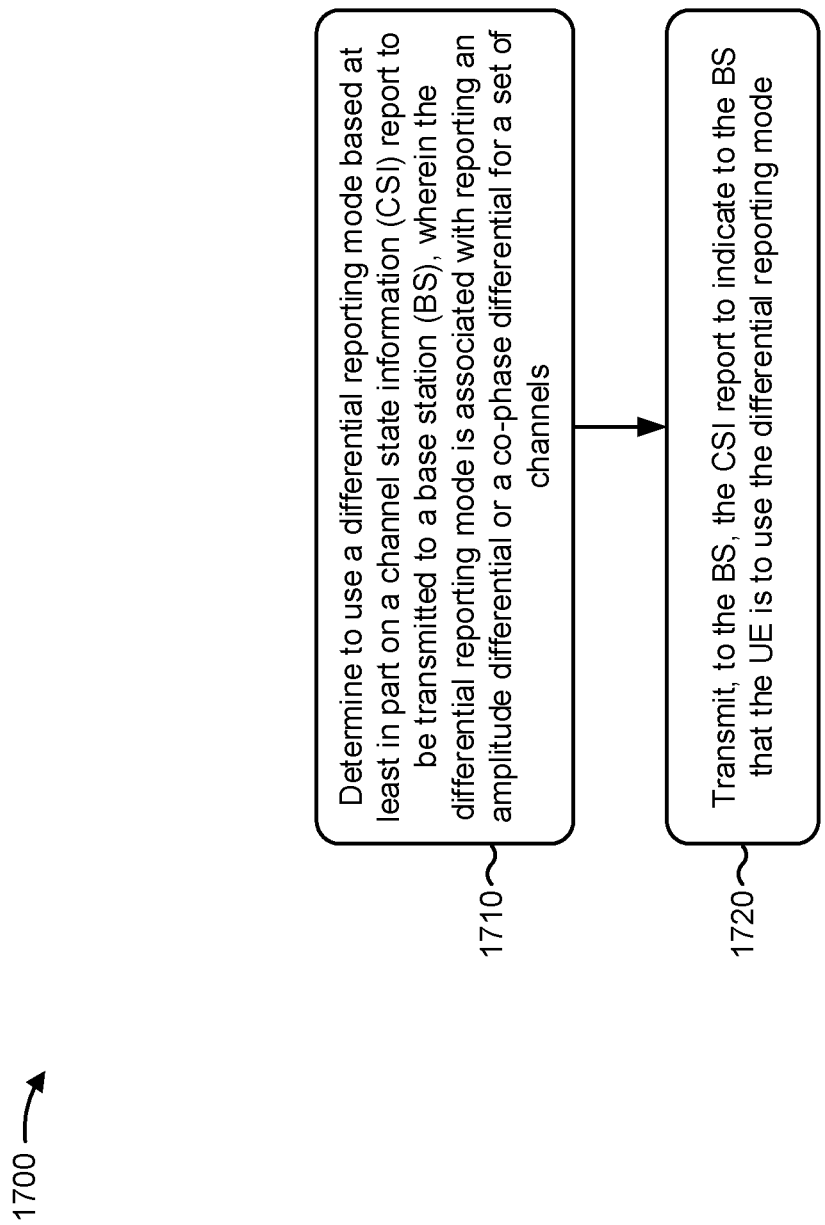
FIG. 17 is a diagram illustrating an example process performed, for example, by a UE, in accordance with various aspects of the present disclosure.

FIG. 17 is a diagram illustrating an example process 1700 performed, for example, by a UE, in accordance with various aspects of the present disclosure. Example process 1700 is an example where a UE (e.g., UE 120 and/or the like) performs operations associated with a differential reporting mode for amplitude and/or co-phase.

As shown in FIG. 17, in some aspects, process 1700 may include determining to use a differential reporting mode based at least in part on a CSI report to be transmitted to a BS, wherein the differential reporting mode is associated with reporting an amplitude differential or a co-phase differential for a set of channels (block 1710). For example, the UE (e.g., using controller/processor 280, and/or the like) may determine to use a differential reporting mode based at least in part on a CSI report to be transmitted to a BS, as described above. In some aspects, the differential reporting mode is associated with reporting an amplitude differential or a co-phase differential for a set of channels.

As further shown in FIG. 17, in some aspects, process 1700 may include transmitting, to the BS, the CSI report to indicate to the BS that the UE is to use the differential reporting mode (block 1720). For example, the user equipment (e.g., using controller/processor 280, transmit processor 264, TX MIMO processor 266, MOD 254, antenna 252, and/or the like) may transmit, to the BS, the CSI report to indicate to the BS that the UE is to use the differential reporting mode, as described above.

Process 1700 may include additional aspects, such as any single aspect or any combination of aspects described below and/or in connection with one or more other processes described elsewhere herein.

In a first aspect, one bit of the CSI report is associated with indicating that the UE is to use the differential reporting mode. In a second aspect, alone or in combination with the first aspect, two bits of the CSI report are associated with indicating a step size for the co-phase differential. In a third aspect, alone or in combination with one or more of the first and second aspects, two bits of the CSI report are associated with indicating a step size of the amplitude differential. In a fourth aspect, alone or in combination with one or more of the first through third aspects, one bit of the CSI report is used to indicate the amplitude differential for a wideband. In a fifth aspect, alone or in combination with one or more of the first through fourth aspects, one bit of the CSI report is used to indicate the amplitude differential or the co-phase differential for a sub-band.

In a sixth aspect, alone or in combination with one or more of the first through fifth aspects, the differential reporting mode has a periodicity for reporting that is less than or equal to a NR Type II reporting. In a seventh aspect, alone or in combination with one or more of the first through sixth aspects, the CSI report includes: a bit value of 00 for a two-bit indicator to indicate that a step size of the co-phase differential is Pi/4, a bit value of 01 for the two-bit indicator to indicate that the step size of the co-phase differential is Pi/8, a bit value of 10 for the two-bit indicator to indicate that the step size of the co-phase differential is Pi/16, or a bit value of 11 for the two-bit indicator to indicate that the step size of the co-phase differential is Pi/32. In an eighth aspect, alone or in combination with one or more of the first through seventh aspects, the CSI report includes: a bit value of 00 for a two-bit indicator to indicate that a step size of the amplitude differential is 1, a bit value of 01 for the two-bit indicator to indicate that the step size of the amplitude differential is 2, a bit value of 10 for the two-bit indicator to indicate that the step size of the amplitude differential is 3, or a bit value of 11 for the two-bit indicator to indicate that the step size of the amplitude differential is 4.

In a ninth aspect, alone or in combination with one or more of the first through eighth aspects, the amplitude differential is in relation to a previous amplitude differential or a previous amplitude. In a tenth aspect, alone or in combination with one or more of the first through ninth aspects, the co-phase differential is in relation to a previous co-phase differential or a previous co-phase. In an eleventh aspect, alone or in combination with one or more of the first through tenth aspects, a report associated with the differential reporting mode has a smaller quantity of bits than a NR Type II report.

In a twelfth aspect, alone or in combination with one or more of the first through eleventh aspects, the UE may transmit, to the BS, a report based at least in part on transmitting the CSI report to the BS. In a thirteenth aspect, alone or in combination with one or more of the first through twelfth aspects, the report includes information identifying the amplitude differential or the co-phase differential. In a fourteenth aspect, alone or in combination with one or more of the first through thirteenth aspects, the report is to be used by the BS to determine a precoder. In a fifteenth aspect, alone or in combination with one or more of the first through fourteenth aspects, the precoder is based at least in part on the amplitude differential or the co-phase differential identified in the report.

In a sixteenth aspect, alone or in combination with one or more of the first through fifteenth aspects, the UE may receive, from the BS, a PDSCH communication via the precoder. In a seventeenth aspect, alone or in combination with one or more of the first through sixteenth aspects, the UE may receive, from the BS, signaling that indicates that the UE is to adjust a step size of the amplitude differential or the co-phase differential based at least in part on transmitting the CSI report, adjusting the amplitude differential or the co-phase differential based at least in part on receiving the signaling, and transmitting, to the BS, a report that indicates that the amplitude differential or the co-phase differential have been adjusted. In an eighteenth aspect, alone or in combination with one or more of the first through seventeenth aspects, the UE may receive, from the BS, DCI based at least in part on receiving the signaling. In a nineteenth aspect, alone or in combination with one or more of the first through eighteenth aspects, the DCI indicates that the report from the UE includes an error. In some aspects, the DCI indicates a time index of a last successful downlink transmission. In a twentieth aspect, alone or in combination with one or more of the first through nineteenth aspects, the signaling is RRC signaling.

In a twenty-first aspect, alone or in combination with one or more of the first through twentieth aspects, the UE may receive, from the BS, a PDSCH communication via a precoder that is based at least in part on the amplitude differential or the co-phase differential identified in the report.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station (BS), comprising:
   determining that a user equipment (UE) is to use a differential reporting mode based at least in part on a channel state information (CSI) report from the UE, wherein the differential reporting mode is associated with reporting an amplitude differential or a co-phase differential for a set of channels; and
   transmitting, to the UE, signaling to cause the UE to use the differential reporting mode based at least in part on determining that the UE is to use the differential reporting mode,
   wherein the signaling includes an indication of a step size of the amplitude differential or a step size of the co-phase differential.

2. The method of claim 1, wherein the signaling is radio resource control (RRC) signaling.

3. The method of claim 1, wherein one bit of the signaling is associated with causing the UE to use the differential reporting mode.

4. The method of claim 1, wherein two bits of the signaling are associated with indicating the step size for the co-phase differential.

5. The method of claim 1, wherein two bits of the signaling are associated with indicating the step size of the amplitude differential.

6. The method of claim 1, wherein the differential reporting mode has a periodicity for reporting that is less than or equal to a periodicity for New Radio (NR) Type II reporting.

7. The method of claim 1, wherein the signaling includes at least one of:
   a bit value corresponding to the step size of the co-phase differential, or
   a bit value for a two-bit indicator corresponding to the step size of the amplitude differential.

8. The method of claim 1, wherein the amplitude differential is in relation to a previous amplitude differential or a previous amplitude.

9. The method of claim 1, wherein the co-phase differential is in relation to a previous co-phase differential or a previous co-phase.

10. The method of claim 1, wherein a report associated with the differential reporting mode has a smaller quantity of bits than a New Radio (NR) Type II report.

11. The method of claim 1, further comprising:
    receiving a report from the UE based at least in part on transmitting the signaling to the UE,
    wherein the report includes information identifying the amplitude differential or the co-phase differential.

12. The method of claim 11, further comprising:
    determining a precoder based at least in part on receiving the report,
    wherein the precoder is based at least in part on the amplitude differential or the co-phase differential identified in the report; and
    transmitting, to the UE, a physical downlink shared channel (PDSCH) communication using the precoder.

13. The method of claim 12, further comprising:
    determining whether the amplitude differential or the co-phase differential will converge to real values for an amplitude or a co-phase based at least in part on transmitting the PDSCH communication.

14. The method of claim 13, further comprising:
    selectively adjusting or maintaining the step size for the amplitude differential or the co-phase differential based at least in part on determining whether the amplitude differential or the co-phase differential will converge to real values for the amplitude or the co-phase; and
    transmitting, to the UE and when the step size is adjusted, additional signaling to indicate the step size for the amplitude differential or the co-phase differential based at least in part on adjusting the step size.

15. The method of claim 13, further comprising:
    transmitting, to the UE, downlink control information (DCI) based at least in part on determining that the amplitude differential or the co-phase differential will not converge to the real values for the amplitude or the co-phase.

16. The method of claim 15, wherein the DCI indicates that the report includes an error.

17. The method of claim 15, wherein the DCI indicates a time index of a last successful downlink transmission.

18. The method of claim 17, further comprising:
    scanning a channel state information reference signal (CSI-RS) using another precoder that corresponds to the time index.

19. A method of wireless communication performed by a user equipment (UE), comprising:
- determining to use a differential reporting mode based at least in part on a channel state information (CSI) report to be transmitted to a base station (BS),
  - wherein the differential reporting mode is associated with reporting an amplitude differential or a co-phase differential for a set of channels; and
- transmitting, to the BS, the CSI report to indicate to the BS that the UE is to use the differential reporting mode,
- wherein the CSI report includes an indication of a step size of the amplitude differential or a step size of the co-phase differential.

20. The method of claim 19, further comprising:
- transmitting, to the BS, a report based at least in part on transmitting the CSI report to the BS,
  - wherein the report includes information identifying the amplitude differential or the co-phase differential.

21. The method of claim 20, further comprising:
- receiving, from the BS, a physical downlink shared channel (PDSCH) communication via a precoder that is based at least in part on the amplitude differential or the co-phase differential identified in the report.

22. The method of claim 19, further comprising:
- receiving, from the BS, signaling that indicates that the UE is to adjust the step size of the amplitude differential or the co-phase differential based at least in part on transmitting the CSI report;
- adjusting the amplitude differential or the co-phase differential based at least in part on receiving the signaling; and
- transmitting, to the BS, a report that indicates that the amplitude differential or the co-phase differential have been adjusted.

23. The method of claim 22, further comprising:
- receiving, from the BS, downlink control information (DCI) based at least in part on receiving the signaling.

24. The method of claim 23, wherein the DCI indicates that the report from the UE includes an error.

25. The method of claim 23, wherein the DCI indicates a time index of a last successful downlink transmission.

26. A base station (BS) for wireless communication, comprising:
- one or more memories; and
- one or more processors operatively coupled to the one or more memories, the one or more memories and the one or more processors configured to:
  - determine that a user equipment (UE) is to use a differential reporting mode based at least in part on a channel state information (CSI) report from the UE,
    - wherein the differential reporting mode is associated with reporting an amplitude differential or a co-phase differential for a set of channels; and
  - transmit, to the UE, signaling to cause the UE to use the differential reporting mode based at least in part on determining that the UE is to use the differential reporting mode,
    - wherein the signaling includes an indication of a step size of the amplitude differential or a step size of the co-phase differential.

27. The BS of claim 26, wherein the differential reporting mode has a periodicity for reporting that is less than or equal to a periodicity for New Radio (NR) Type II reporting.

28. The BS of claim 26, wherein the one or more processors are further to:
- receive a report from the UE based at least in part on transmitting the signaling to the UE,
  - wherein the report includes information identifying the amplitude differential or the co-phase differential.

29. The BS of claim 28, wherein the one or more processors are further to:
- determine a precoder based at least in part on receiving the report,
  - wherein the precoder is based at least in part on the amplitude differential or the co-phase differential identified in the report; and
- transmit, to the UE, a physical downlink shared channel (PDSCH) communication using the precoder.

30. A user equipment (UE) for wireless communication, comprising:
- one or more memories; and
- one or more processors operatively coupled to the one or more memories, the one or more memories and the one or more processors configured to:
  - determine to use a differential reporting mode based at least in part on a channel state information (CSI) report to be transmitted to a base station (BS),
    - wherein the differential reporting mode is associated with reporting an amplitude differential or a co-phase differential for a set of channels; and
  - transmit, to the BS, the CSI report to indicate to the BS that the UE is to use the differential reporting mode,
    - wherein the CSI report includes an indication of a step size of the amplitude differential or a step size of the co-phase differential.

* * * * *